US012608128B2

(12) United States Patent
Mao

(10) Patent No.: US 12,608,128 B2
(45) Date of Patent: Apr. 21, 2026

(54) DEVICE INTERACTION METHOD, ELECTRONIC DEVICE, AND INTERACTION SYSTEM

(71) Applicant: Huawei Technologies Co., Ltd., Shenzhen (CN)

(72) Inventor: Chunjing Mao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 489 days.

(21) Appl. No.: 18/245,079

(22) PCT Filed: Sep. 3, 2021

(86) PCT No.: PCT/CN2021/116476
§ 371 (c)(1),
(2) Date: Mar. 13, 2023

(87) PCT Pub. No.: WO2022/057644
PCT Pub. Date: Mar. 24, 2022

(65) Prior Publication Data
US 2023/0409192 A1 Dec. 21, 2023

(30) Foreign Application Priority Data
Sep. 16, 2020 (CN) .......................... 202010978193.3

(51) Int. Cl.
| | |
|---|---|
| *G06F 3/04886* | (2022.01) |
| *A63F 13/214* | (2014.01) |
| *A63F 13/23* | (2014.01) |
| *G06F 3/01* | (2006.01) |
| *G06F 3/04815* | (2022.01) |
| *G06F 3/14* | (2006.01) |

(52) U.S. Cl.
CPC ........ *G06F 3/04886* (2013.01); *A63F 13/214* (2014.09); *A63F 13/23* (2014.09); *G06F 3/011* (2013.01); *G06F 3/04815* (2013.01); *A63F 2300/8082* (2013.01); *G06F 3/1454* (2013.01)

(58) Field of Classification Search
CPC .. G06F 3/04886; G06F 3/011; G06F 3/04815; G06F 3/1454; A63F 13/214; A63F 13/23; A63F 2300/8082
USPC .......................................................... 463/37
See application file for complete search history.

(56) References Cited

U.S. PATENT DOCUMENTS

| | | | | |
|---|---|---|---|---|
| 10,504,290 B2 * | 12/2019 | Rogers | .................. | G06F 3/0484 |
| 10,817,128 B2 * | 10/2020 | Murphy | .................. | G06F 3/011 |
| 10,860,100 B2 * | 12/2020 | Osterhout | ............. | G06F 3/0346 |

(Continued)

FOREIGN PATENT DOCUMENTS

| | | |
|---|---|---|
| CN | 102902471 A | 1/2013 |
| CN | 107122096 A | 9/2017 |

(Continued)

*Primary Examiner* — Allen Chan
(74) *Attorney, Agent, or Firm* — Slater Matsil, LLP

(57) ABSTRACT

A device interaction method, an electronic device, and an interaction system are provided. The device interaction method includes: After detecting that a VR/AR device connected to an electronic device enters a predetermined operating mode, the electronic device generates at least two interaction interfaces used by the VR/AR device to perform an interaction operation, and displays at least one of the interaction interfaces in a display area of the electronic device.

21 Claims, 14 Drawing Sheets

(56)       References Cited

U.S. PATENT DOCUMENTS

2017/0076502 A1     3/2017   Chen et al.
2017/0249019 A1*   8/2017   Sawyer ................. G06F 3/0304
2018/0365025 A1*   12/2018   Almecija ............. G06F 3/0482
2019/0391391 A1     12/2019   Pazmino et al.

FOREIGN PATENT DOCUMENTS

CN         108513016 A      9/2018
CN         108646997 A     10/2018
WO    WO-2014039201 A1 *   3/2014     ............. G06F 3/011

* cited by examiner

Virtual screen

VR/AR device

Smartwatch

Mobile phone

1301

Home

Add

Open

Document

1302

Mobile phone

101

102

DEVICE INTERACTION METHOD, ELECTRONIC DEVICE, AND INTERACTION SYSTEM

CROSS-REFERENCE TO RELATED APPLICATIONS

This application is a national stage of International Application No. PCT/CN2021/116476, filed on Sep., 3, 2021, which claims priority to Chinese Patent Application No. 202010978193.3, filed on Sep. 16, 2020. Both of the aforementioned applications are hereby incorporated by reference in their entireties.

TECHNICAL FIELD

This application relates to the field of virtual reality and augmented reality technologies, and in particular, to a device interaction method, an electronic device, a computer-readable storage medium, and an interaction system.

BACKGROUND

With development of computer graphics technologies, technologies such as virtual reality (virtual reality, VR), augmented reality (augmented reality, AR), and mixed reality (mixed reality, MR) are gradually applied to people's lives.

VR simulates a 3D virtual space on a computer, and provides a visual simulation effect, thereby allowing users to feel as if they are in the virtual space and to interact with the virtual space.

AR is a technology that integrates real world information and virtual world information. It superimposes physical information such as visual information, a sound, a taste, and a touch, which is difficult to experience in a specific time and space range of a real world, into the real world through simulation by using computer technology and other sciences and technologies. In this way, the users can obtain sensory experience beyond reality.

MR mixes the real world and a virtual world together to create a new visualization environment that includes both the real world information and the virtual world information. The real world and the virtual world can interact in real time.

When existing electronic devices such as a VR/AR helmet or AR glasses perform an interaction operation by using technologies such as VR, AR, and MR, simple interaction is mainly implemented by using a gesture, a head movement, a voice, eyeball tracking, and the like. However, it is difficult to meet efficient and complex interaction requirements such as graphical interface positioning and text input in scenarios such as a mobile office, entertainment, and a game.

SUMMARY

This application provides a device interaction method, an electronic device, and an interaction system, to improve interaction efficiency of a VR/AR device, and meet complex interaction requirements in more scenarios.

To achieve the foregoing objective, the following technical solutions are used in this application.

According to a first aspect, a device interaction method is provided. The method includes: After detecting that a VR/AR device connected to an electronic device enters a predetermined operating mode, the electronic device generates, in a display area of the electronic device, at least two interaction interfaces used by the VR/AR device to perform an interaction operation, and displays at least one of the interaction interfaces in the display area of the electronic device. The electronic device receives an interaction operation input by a user in the displayed interaction interface, and sends the interaction operation to the VR/AR device. The VR/AR device performs a corresponding action in response to the interaction operation after receiving the interaction operation.

The predetermined operating mode may be a virtual PC mode. After entering the virtual PC mode, the VR/AR device projects a virtual screen for the user. The electronic device generates, in the display area of the electronic device, the at least two interaction interfaces used by the VR/AR device to perform the interaction operation, and displays the at least one of the interaction interfaces in the display area of the electronic device. The interaction operation may be an interaction operation that can achieve positioning, dragging, zooming, drawing, and character entering. The interaction interface may include but is not limited to a virtual touchpad interface, a virtual keyboard interface, and a joypad interface. The virtual touchpad interface is used to receive a touch operation input by the user, the virtual keyboard interface is used to receive a character entered by the user, and the joypad interface is used to receive a game operation input by the user. It may be understood that the predetermined operating mode may alternatively be another mode such as a virtual cinema mode or a screen sharing mode.

The interaction operation is a touch operation, a character entering operation, a game operation input by the user on the interaction interface.

Based on the technical solution, the electronic device is configured to generate the at least two interaction interfaces used by the VR/AR device to perform the interaction operation, and display at least one of the interaction interfaces in the display area of the electronic device. In combination with the VR/AR device, the user can input a plurality of interaction operations such as positioning, dragging, zooming, character entering, and a game operation by using the interaction interface displayed in the display area of the electronic device, to perform an operation on content on the virtual screen. This improves interaction efficiency of the VR/AR device, and meets complex interaction requirements in more scenarios.

In a possible implementation of the first aspect, that the VR/AR device performs a corresponding action in response to the interaction operation after receiving the interaction operation includes: After receiving the interaction operation, the VR/AR device performs, on a virtual screen currently displayed by the VR/AR device, an action corresponding to the interaction operation. In this way, display content of the virtual screen can be operated accurately based on the interaction operation, to complete human-computer interaction.

The VR/AR device parses the received interaction operation, determines the action corresponding to the interaction operation, and then performs the corresponding action on the virtual screen, to implement interaction. It should be noted that a correspondence between the interaction operation and the action corresponding to the interaction operation can be preset based on an operation habit of the user. For example, an action corresponding to a sliding operation is preset as controlling a cursor to move, a moving distance is related to a sliding distance (for example, linear correlation), and a moving direction is consistent with a sliding direction. An action corresponding to the character entering operation is to enter a corresponding character at a location of the cursor. Details are not described herein again.

In a possible implementation of the first aspect, when at least two electronic devices are connected to the VR/AR device, that the electronic device displays, in the display area of the electronic device after detecting that a VR/AR device connected to an electronic device enters a predetermined operating mode, at least two interaction interfaces used by the VR/AR device to perform an interaction operation includes:

After detecting that the VR/AR device connected to the electronic device enters the predetermined operating mode, the electronic device displays, in the display area of the electronic device, at least one interaction interface different from that of another electronic device. The another electronic device is an electronic device other than the current electronic device in the electronic devices connected to the VR/AR device.

Herein, the VR/AR device can read a relative size of a display of the electronic device connected to the VR/AR device, to automatically configure an interaction interface corresponding to the electronic device. For example, in a device combination of a mobile phone and a tablet computer, after obtaining sizes of displays of the mobile phone and the tablet computer, the VR/AR device automatically sets the virtual keyboard interface to be displayed on the display of the tablet computer (the size of the display is large), and the virtual touchpad interface to be displayed on the display of the mobile phone (the size of the display is small). For another example, in a device combination of a mobile phone and a smartwatch, after obtaining sizes of displays of the mobile phone and the smartwatch, the VR/AR device can automatically set the virtual keyboard interface to be displayed on the display of the mobile phone (the size of the display is large), and the virtual touchpad interface to be displayed on the display of the smartwatch (the size of the display is small). In addition, after completing automatic setting, the VR/AR device may further send a message to the user for confirmation. If the user confirms the setting, the VR/AR device performs the setting based on the automatic setting; otherwise, the VR/AR device performs the setting based on selection of the user.

For example, after reading a size of the electronic device, the VR/AR device reports the information to the user for selection. The user may choose to use a mobile phone as a keyboard input to display the virtual keyboard interface, and use a tablet as a touch or handwriting/painting input to display the virtual touchpad interface. In a use process, the user can set different interaction interfaces on different electronic devices at any time, that is, can perform automatic configuration or support manual configuration by the user.

In a possible implementation of the first aspect, the electronic device can further switch a currently displayed interaction interface based on a switching operation. In this way, the electronic device can display an interaction interface required by the user based on a user requirement, to facilitate a user operation. This improves interaction efficiency.

According to a second aspect, a device interaction method is provided, applied to an electronic device. The electronic device is connected to a VR/AR device. The device interaction method includes: After detecting that a VR/AR device connected to an electronic device enters a predetermined operating mode, the electronic device generates, in a display area of the electronic device at least two interaction interfaces used by the VR/AR device to perform an interaction operation, and displays at least one of the interaction interfaces in the display area of the electronic device. The electronic device receives an interaction operation input by a user in the displayed interaction interface. The electronic device sends the interaction operation to the VR/AR device, so that the VR/AR device performs a corresponding action in response to the interaction operation.

The predetermined operating mode may also be a virtual PC mode. After entering the virtual PC mode, the VR/AR device projects a virtual screen for the user. The electronic device generates, in the display area of the electronic device, the at least two interaction interfaces used by the VR/AR device to perform the interaction operation, and displays the at least one of the interaction interfaces in the display area of the electronic device. The interaction operation may be an interaction operation that can achieve positioning, dragging, zooming, drawing, character entering, and a game operation. The interaction interface may include but is not limited to a virtual touchpad interface, a virtual keyboard interface, and a joypad interface. The virtual touchpad interface is used to receive a touch operation input by the user, the virtual keyboard interface is used to receive a character entered by the user, and the joypad interface is used to receive a game operation input by the user. Similarly, the predetermined operating mode may alternatively be another mode such as a virtual cinema mode or a screen sharing mode.

The interaction operation is a touch operation, a character entering operation, a game operation input by the user on the interaction interface.

Based on the technical solution, the electronic device is configured to generate the at least two interaction interfaces used by the VR/AR device to perform the interaction operation, and display at least one of the interaction interfaces in the display area of the electronic device. In combination with the VR/AR device, the user can input a plurality of interaction operations such as positioning, dragging, zooming, character entering, and a game operation by using the interaction interface displayed in the display area of the electronic device, to perform an operation on content on the virtual screen. This improves interaction efficiency of the VR/AR device, and meets complex interaction requirements in more scenarios.

In a possible implementation of the second aspect, when at least two electronic devices are connected to the VR/AR device, that the electronic device displays, in the display area of the electronic device after detecting that a VR/AR device connected to an electronic device enters a predetermined operating mode, at least two interaction interfaces used by the VR/AR device to perform an interaction operation includes:

After detecting that the VR/AR device connected to the electronic device enters the predetermined operating mode, the electronic device displays, in the display area of the electronic device, at least one interaction interface different from that of another electronic device. The another electronic device is an electronic device other than the current electronic device in the electronic devices connected to the VR/AR device.

Herein, the VR/AR device can read a relative size of a display of the electronic device connected to the VR/AR device, to automatically configure an interaction interface corresponding to the electronic device. For example, in a device combination of a mobile phone and a tablet computer, after obtaining sizes of displays of the mobile phone and the tablet computer, the VR/AR device automatically sets the virtual keyboard interface to be displayed on the display of the tablet computer (the size of the display is large), and the virtual touchpad interface to be displayed on the display of the mobile phone (the size of the display is small). For another example, in a device combination of a mobile phone and a smartwatch, after obtaining sizes of displays of the mobile phone and the smartwatch, the VR/AR device can automatically set the virtual keyboard interface to be displayed on the display of the mobile phone (the size of the display is large), and the virtual touchpad interface to be not displayed on the display of the smartwatch (the size of the display is small). In addition, after completing automatic setting, the VR/AR device may further send a message to the user for confirmation. If the user confirms the setting, the VR/AR device performs the setting based on the automatic setting; otherwise, the VR/AR device performs the setting based on selection of the user.

For example, after reading a size of the electronic device, the VR/AR device reports the information to the user for selection. The user may choose to use a mobile phone as a keyboard input to display the virtual keyboard interface, and use a tablet as a touch or handwriting/painting input to display the virtual touchpad interface. In a use process, the user can set different interaction interfaces on different electronic devices at any time, that is, can perform automatic configuration or support manual configuration by the user.

In a possible implementation of the second aspect, the electronic device can further switch a currently displayed interaction interface based on a switching operation. In this way, the electronic device can display an interaction interface required by the user based on a user requirement, to facilitate a user operation. This improves interaction efficiency.

According to a third aspect, an electronic device is provided. The electronic device is connected to a VR/AR device. The electronic device includes a display unit, a receiving unit, and a communication unit.

The display unit is configured to: after detecting that a VR/AR device connected to the electronic device enters a predetermined operating mode, generate, in a display area of the electronic device, at least two interaction interfaces used by the VR/AR device to perform an interaction operation, and display at least one of the interaction interfaces in the display area of the electronic device.

The receiving unit is configured to receive an interaction operation input by a user in the displayed interaction interface.

The communication unit is configured to send the interaction operation to the VR/AR device, so that the VR/AR device performs a corresponding action in response to the interaction operation.

According to a fourth aspect, an electronic device is provided, including a processor and a memory. The processor is coupled to the memory. The memory is configured to store computer program instructions. When the processor executes the computer program instructions, the electronic device is enabled to perform the device interaction method according to the second aspect.

According to a fifth aspect, a computer program product including instructions is provided. When the computer program product runs on a computer, the computer is enabled to perform the device interaction method according to any one of the designs of the second aspect.

According to a sixth aspect, a chip is provided. The chip includes a processor. When the processor executes instructions, the processor is configured to perform the device interaction method according to any one of the designs of the second aspect. The instructions may be from a memory inside the chip, or may be from a memory outside the chip. Optionally, the chip further includes an input/output circuit.

According to a seventh aspect, an interaction system is provided. The interaction system includes the electronic device according to the third aspect or the fourth aspect, and a VR/AR device connected to the electronic device.

For technical effects brought by any design in the third aspect to the ninth aspect, refer to technical effects brought by the foregoing corresponding methods. Details are not described herein again.

DETAILED DESCRIPTION OF ILLUSTRATIVE EMBODIMENTS

Figure 1:
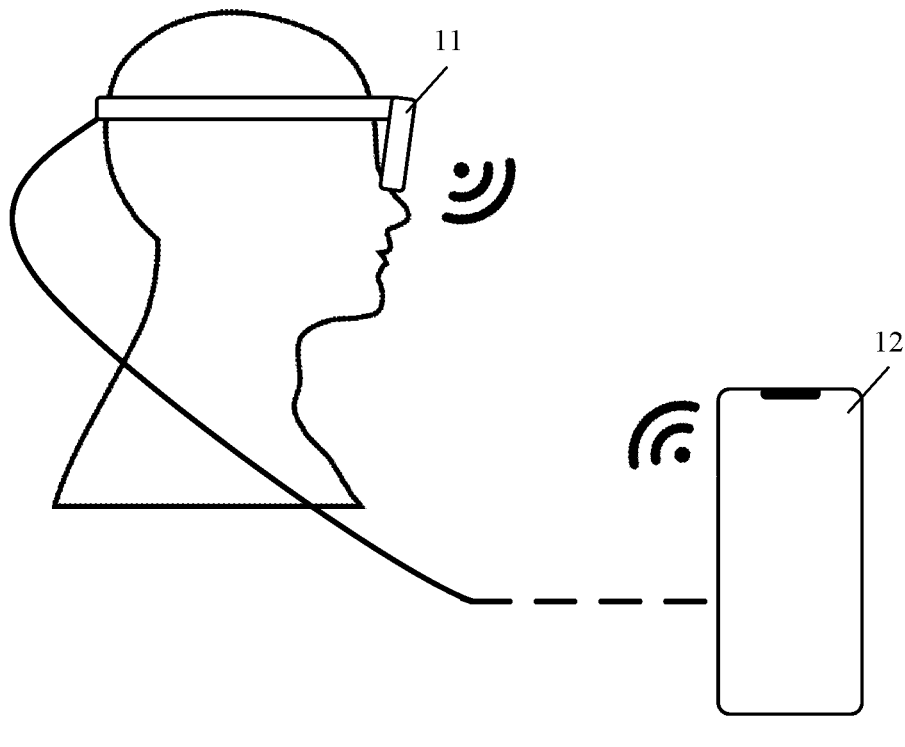
FIG. 1 is a diagram of a system architecture of an interaction system according to an embodiment of this application.

In descriptions of this application, unless otherwise specified, "/" means "or". For example, A/B may represent A or B. The term "and/or" in this application describes only an association relationship between associated objects and indicates that there may be three relationships. For example, A and/or B may represent the following three cases: Only A exists, both A and B exist, and only B exists. In addition, "at least one" means one or more, and "a plurality of" means two or more. The terms such as "first" and "second" do not limit a quantity and a performance sequence, and the terms such as "first" and "second" are not necessarily different.

It should be noted that, in this application, the terms such as "for example" or "such as" are used for representing giving an example, an illustration, or a description. Any embodiment or design scheme described as an "for example" or "such as" in this application should not be explained as being more preferred or having more advantages than another embodiment or design scheme. Exactly, use of the terms "for example", "such as" is intended to present a related concept in a specific manner.

The following further describes this application in detail with reference to the drawings and specific embodiments. It should be understood that the specific embodiments are merely used to explain this application but are not intended to limit this application.

An AR/VR device that has a video see-through (video see-through, VST) function, a virtual reality function, an augmented reality function, and a mixed reality function may virtualize a display in front of a user by using a projection function, to implement a function of a virtual PC. Currently, the AR/VR device mostly performs interaction in simple interaction manners such as gesture, head movement, voice, eyeball tracking, and touch (touch is performed by using a touch module disposed in the AR/VR device). However, it is difficult to meet efficient and complex interaction requirements such as graphical interface positioning and text input in scenarios such as a mobile office, entertainment, and a game.

To meet the efficient and complex interaction requirements such as graphical interface positioning and text input in the scenarios such as the mobile office, entertainment, and the game, a "virtual keyboard" that is suspended in the air or attached to the surface of an object/human body through near-eye display and visual recognition is proposed based on the conventional technology. However, a visual recognition function needs to be introduced, which not only causes high system power consumption, but also results in an interaction failure due to low accuracy of visual recognition. In addition, during interaction, it is necessary to ensure that the line of sight is aligned with the "virtual keyboard", so that the "virtual keyboard" can be selected and used to enter text, resulting in low interaction efficiency.

In addition, the AR/VR device may be connected to a keyboard, a mouse, a touchpad, a handle, and other devices in a wired/wireless connection manner, and then the AR/VR device virtualizes the display in front of the user by using the projection function. Then, the AR/VR device implements a requirement to interact with the "virtual PC" by combining the handle, the touchpad, the keyboard, and the mouse that are connected to the AR/VR device. To be specific, the display of the virtual PC is projected by the VR/AR device, and then the devices such as the handle, the touchpad, the keyboard, and the mouse that are connected to the VR/AR device are used as input devices to interact with the virtual PC, so as to implement the interaction requirements of text input and graphical interface positioning. However, this requires additional input devices such as a keyboard and a mouse, resulting in poor portability.

To implement the efficient and complex interaction requirements such as graphical interface positioning and text input in the scenarios such as the mobile office, entertainment, and the game, improve interaction efficiency, and improve portability, embodiments of this application provide a device interaction method, an electronic device, and an interaction system. For specific content, refer to the following descriptions.

FIG. 1 is a schematic diagram of an architecture of an interaction system to which the technical solutions of this application are applicable. As shown in FIG. 1, the interaction system may include a VR/AR device 11 and at least one electronic device 12 that has display and touch functions.

The VR/AR device 11 may be connected to the electronic device 12 in a wired/wireless connection manner. For example, the VR/AR device 11 may be connected to the electronic device 12 by using a VR connection cable/AR connection cable. Certainly, the VR/AR device 11 and the electronic device 12 may also be interconnected based on a wireless communication network. The communication network may be a local area network, or may be a wide area network transferred by using a relay (relay) device. When the communication network is a local area network, for example, the communication network may be a short-range communication network such as a Wi-Fi hotspot network, a Zigbee network, or a near field communication (near field communication, NFC) network. When the communication network is a wide area network, for example, the communication network may be a 3rd-generation mobile communication technology (3rd-generation mobile communication technology, 3G) network, a 4th generation mobile communication technology (4th generation mobile communication technology, 4G) network, a 5th-generation mobile communication technology (5th-generation mobile communication technology, 5G) network, a future evolved public and mobile network (public and mobile network, PLMN), or the Internet. It may be understood that the communication network and a service scenario described in embodiments of this application are intended to describe the technical solutions in embodiments of this application more clearly, and do not constitute a limitation on the technical solutions described in embodiments of this application.

In embodiments of this application, the user may send a control instruction to the VR/AR device 11 by using the electronic device 12, to control the VR/AR device 11 to enter a predetermined operating mode. After entering the predetermined operating mode, the VR/AR device 11 displays, on a virtual screen projected by the VR/AR device 11, display content corresponding to the predetermined operating mode. At the same time, the electronic device 12 generates, in a display area of the electronic device 12, at least two interaction interfaces used by the VR/AR device to perform an interaction operation, and displays at least one of the interaction interfaces in the display area of the electronic device. In this way, the user can enter a plurality of different interaction operations such as positioning, dragging, zooming, character entering, and a game operation on the interaction interface in the display area of the electronic device 12. The electronic device 12 sends the received interaction operation to the VR/AR device 11 connected to the electronic device 12. After receiving the interaction operation sent by the electronic device 12, the VR/AR device 11 can perform a corresponding action based on the interaction operation, to implement interaction requirements of graphical interface positioning and text entering. This improves interaction efficiency.

In embodiments of this application, the predetermined operating mode may be a virtual PC mode. After receiving a control instruction that is sent by the user by using the electronic device 12 and that is used to control the VR/AR device 11 to enter the virtual PC mode, the VR/AR device 11 enters the virtual PC mode. The electronic device 12 connected to the VR/AR device 11 generates, in the display area of the electronic device 12, the at least two interaction interfaces used by the VR/AR device 11 to perform the interaction operation. In this case, the VR/AR device 11 is equivalent to a host of a personal computer, the virtual screen projected by the VR/AR device 11 is equivalent to a display of the personal computer, and the electronic device 12 connected to the VR/AR device 11 is equivalent to an input device (for example, a keyboard or a mouse) of the personal computer. The virtual PC mode is an operating mode in which a VR/AR device is used as a host of a personal computer, and a virtual screen projected by the VR/AR device is used as a display, to implement a personal computer function.

It may be understood that, based on an actual application requirement, the predetermined operating mode may alternatively be another operating mode, for example, a virtual cinema mode or a screen sharing mode. The virtual cinema mode is an operating mode in which a cinema environment is virtualized by using VR/AR glasses, and an image, audio, or a video selected by a user is played by using the VR/AR glasses. The screen sharing mode is an operating mode in which an operation interface of an application used by an electronic device is shared to a virtual screen projected by VR/AR glasses, so that content displayed on the virtual screen projected by the VR/AR glasses is consistent with content displayed on a display of the electronic device.

In embodiments of this application, when determining that the VR/AR glasses enter the virtual PC mode, the electronic device 12 generates, in the display area of the electronic device 12, the at least two interaction interfaces used by the VR/AR device to perform the interaction operation, and displays the at least one of the interaction interfaces. In this way, the user can input a corresponding interaction operation in the interaction interface generated by the electronic device 12, to implement interaction.

In embodiments of this application, the interaction interface includes but is not limited to a virtual touchpad interface, a virtual keyboard interface, and a joypad interface. The virtual touchpad interface is used to receive a touch operation input by a user, the virtual keyboard interface is used to receive a character entered by the user, and the joypad interface is used to receive a game operation input by the user.

Figure 2:
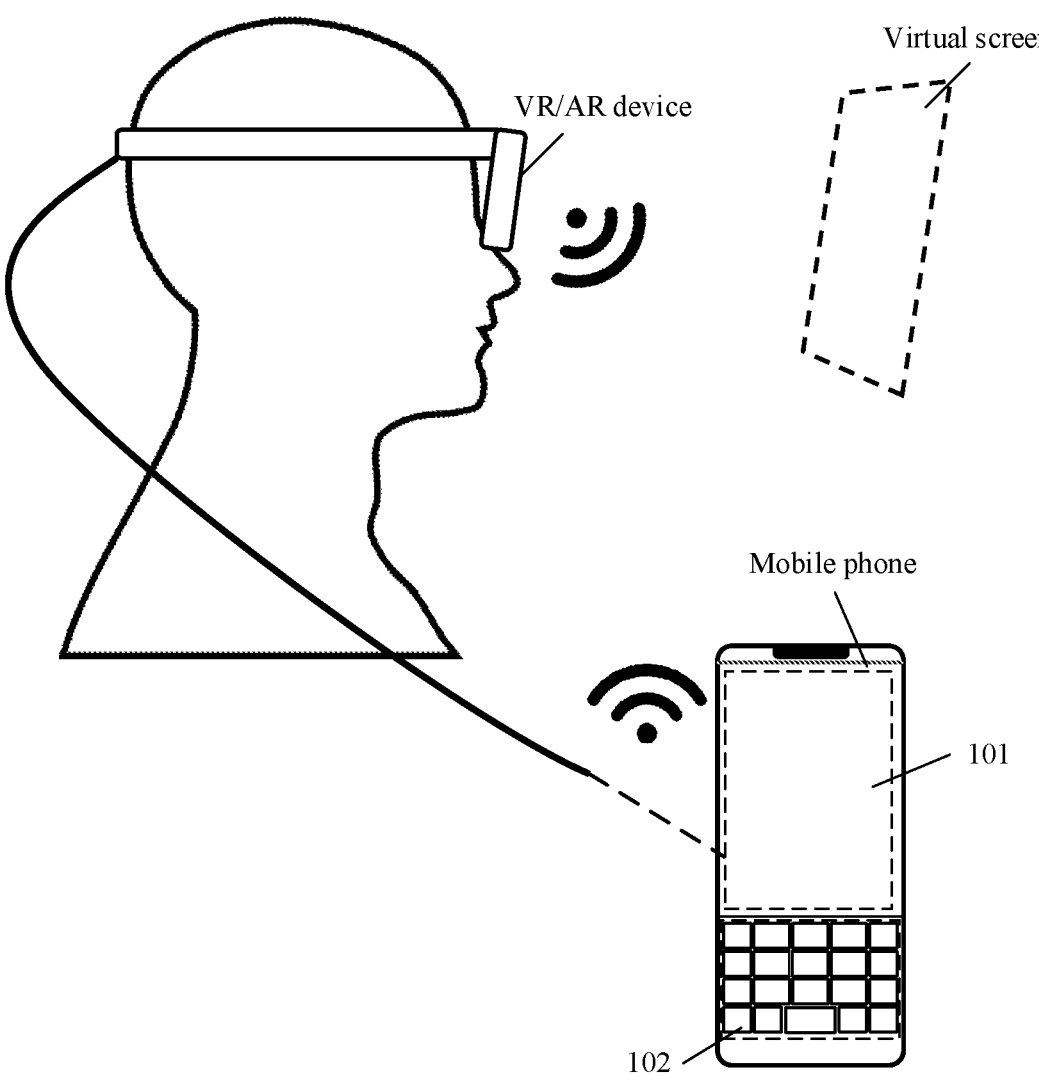
FIG. 2 is a schematic diagram of a scenario in which a generated virtual touchpad interface 101 and a generated virtual keyboard interface 102 are simultaneously displayed in a display area of a mobile phone according to an embodiment of this application.

Refer to FIG. 2. An example in which the electronic device is a mobile phone is used. In embodiments of this application, when the mobile phone determines that the VR/AR device has entered the virtual PC mode, the mobile phone generates the virtual touchpad interface and the virtual keyboard interface in a display area of the mobile phone, and simultaneously displays a virtual touchpad interface 101 and a virtual keyboard interface 102 on a display of the mobile phone.

In this way, the user may input touch operations such as positioning, dragging, and zooming on the virtual touchpad interface 101, and may also enter characters on the virtual keyboard interface 102. In addition, the user may further use the virtual touchpad interface 101 as a handwriting pad, and enter a character on the virtual touchpad interface 101 by using a hand or a touch pen, or may use the virtual touchpad interface 101 as a drawing pad, and input a picture on the virtual touchpad interface 101.

After receiving the touch operation input by the user or the character entered by the user, the electronic device 12 may send the touch operation input by the user and the character entered by the user to the VA/AR device 11. The VA/AR device 11 performs corresponding actions such as sliding, positioning, dragging, and zooming or writes a corresponding character at a cursor location based on the received touch operation, to meet interaction requirements of graphical interface positioning and text entering of the VR/AR glasses in the virtual PC mode.

In embodiments of this application, the virtual keyboard interface may be set based on a display area size of a display of the electronic device. For electronic devices with a large display area, such as a tablet computer and a mobile phone displayed in landscape mode, a virtual keyboard interface of a landscape QWERTY full keyboard may be generated. For a mobile phone and an electronic device whose size is similar to that of the mobile phone, virtual keyboard interfaces of a 3*n keyboard, a 4*n keyboard, and a 5*n keyboard may be generated in a portrait mode. For intelligent wearable devices such as a smartwatch and a smart band, virtual keyboard interfaces of a 3*n keyboard, a 2*n keyboard, or a combination of a smaller keyboard may be generated. Certainly, the electronic device may also generate and display another type of virtual keyboard interface. For example, to ensure input security, the electronic device may generate and display a secure virtual keyboard interface. An input character corresponding to each key on the secure virtual keyboard interface may be determined according to a secret algorithm, and a manner of disordering character distribution is used to prevent input content from being obtained. It may be understood that a manner of setting a virtual keyboard is merely for an example rather than a limitation.

In another embodiment of this application, when the electronic device 11 determines that the VA/AR device enters the virtual PC mode, the electronic device 11 generates a plurality of interaction interfaces such as the virtual touchpad interface, the virtual keyboard interface, and the joypad interface in the display area of the electronic device 11. However, in this case, only one of the interaction interfaces is displayed on the display of the electronic device 11, and other interaction interfaces are hidden. Herein, the electronic device 11 may determine, based on a switching operation input by the user, an interaction interface displayed by the electronic device 11.

In embodiments of this application, the switching operation may be a specific operation preset by the user. Specifically, the switching operation may be pressing a specific key or a specific touch gesture, or may be a combination of the two. This is not limited herein. For example, the switching operation may be pressing a specific key on the virtual keyboard. For another example, the switching operation may be a touch gesture such as sliding a screen rightward or leftward.

For example, the interaction interface of the electronic device can be switched from the virtual keyboard interface to the joypad interface or a virtual touchpad interface by pressing the specific key on the virtual keyboard. Alternatively, the interaction interface of the electronic device can be switched from the virtual touchpad interface to the joypad interface or the virtual keyboard interface by using the specific touch gesture on the virtual touchpad interface. Alternatively, the interaction interface of the electronic device can be switched from the joypad interface to the virtual touchpad interface or the virtual keyboard interface by using the specific touch gesture.

Figure 3:
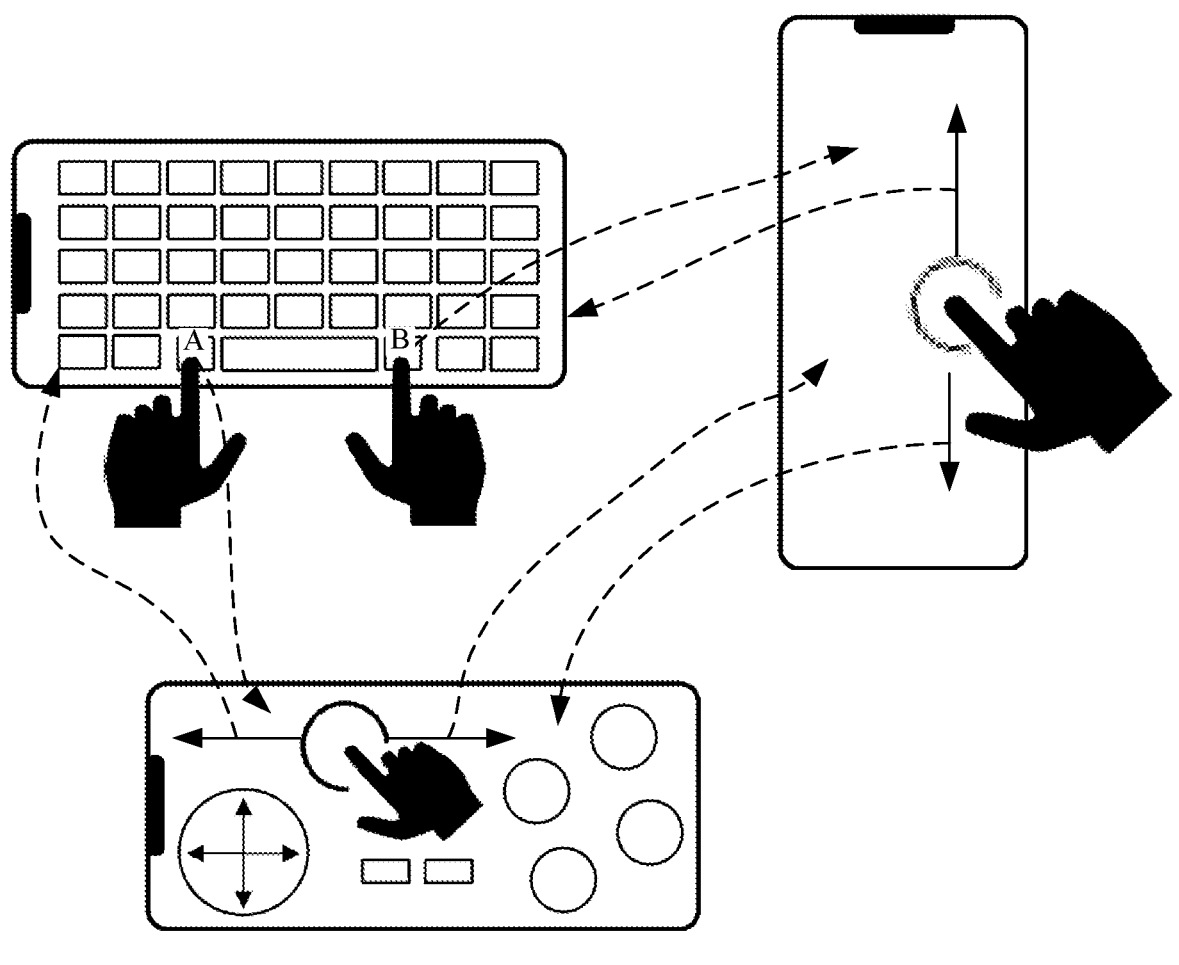
FIG. 3 is a schematic diagram of a scenario in which a displayed interaction interface is switched in a display area of a mobile phone according to an embodiment of this application.

A mobile phone is used as an example. As shown in FIG. 3, when an interaction interface of the mobile phone is on a virtual keyboard interface, the user may switch, by pressing a specific key A, an interaction interface displayed in a display area of the mobile phone to a joypad interface; and the user may switch, by pressing a specific key B, the interaction interface displayed in the display area of the mobile phone to a virtual touchpad interface. When the interaction interface displayed in the display area of the mobile phone is on the virtual touchpad interface, the user may switch, by using a touch gesture of sliding upward, the interaction interface displayed in the display area of the mobile phone to the virtual keyboard interface; and the user may switch, by using a touch gesture of sliding downward, the interaction interface displayed in the display area of the mobile phone to the joypad interface. When the interaction interface displayed in the display area of the mobile phone is on the game operation interface, the user may switch, by using a touch gesture of sliding leftward, the interaction interface displayed in the display area of the mobile phone to the virtual keyboard interface; and the user may switch, by using a touch gesture of sliding rightward, the interaction interface displayed in the display area of the mobile phone to the virtual touchpad interface.

In another embodiment of this application, in addition to switching between interaction interfaces, a composite operation scenario may be further implemented. That is, the composite operation scenario is implemented by using a specific composite wakeup operation on an interaction interface.

Figure 4:
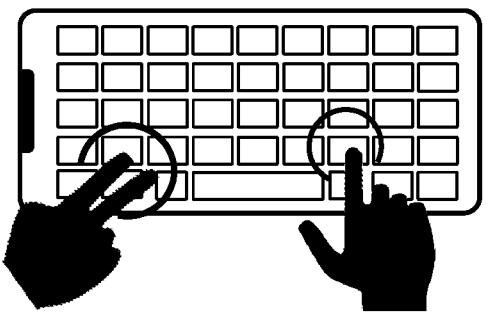
FIG. 4 is a schematic diagram of a scenario in which a composite operation function is enabled in a display area of a mobile phone according to an embodiment of this application.

A mobile phone is used as an example. As shown in FIG. 4, on a virtual keyboard interface, a specific area on a screen is pressed by using two fingers, to enable a composite operation function. That is, the specific area on the screen is pressed by using two fingers of one hand, and a touch operation is input on a display of an electronic device by using another hand, to implement interaction. In this case, although the display of the mobile phone displays the virtual keyboard interface, a function of the virtual touchpad interface can be implemented. It should be noted that the scenarios are only applicable to electronic devices such as a mobile phone and a tablet computer that can be operated by using two hands at the same time, and are not applicable to electronic devices such as a smartwatch or a smart band that can be operated by using only one hand.

In addition, a touch operation may be directly performed on a touchscreen of the electronic device when the electronic device displays the virtual keyboard interface. The direct touch operation may also be considered as a composite wakeup operation. In this case, the touch operation may be directly performed without pressing and holding some specific areas (keys). The scenarios are applicable to electronic devices such as a mobile phone, a tablet computer, a smartwatch, and a smart band.

In another embodiment of this application, a plurality of electronic devices connected to the VR/AR device may be further considered as a whole, and then different interaction interfaces are displayed on the plurality of electronic devices. In this case, different electronic devices may display different interaction interfaces.

Figure 5:
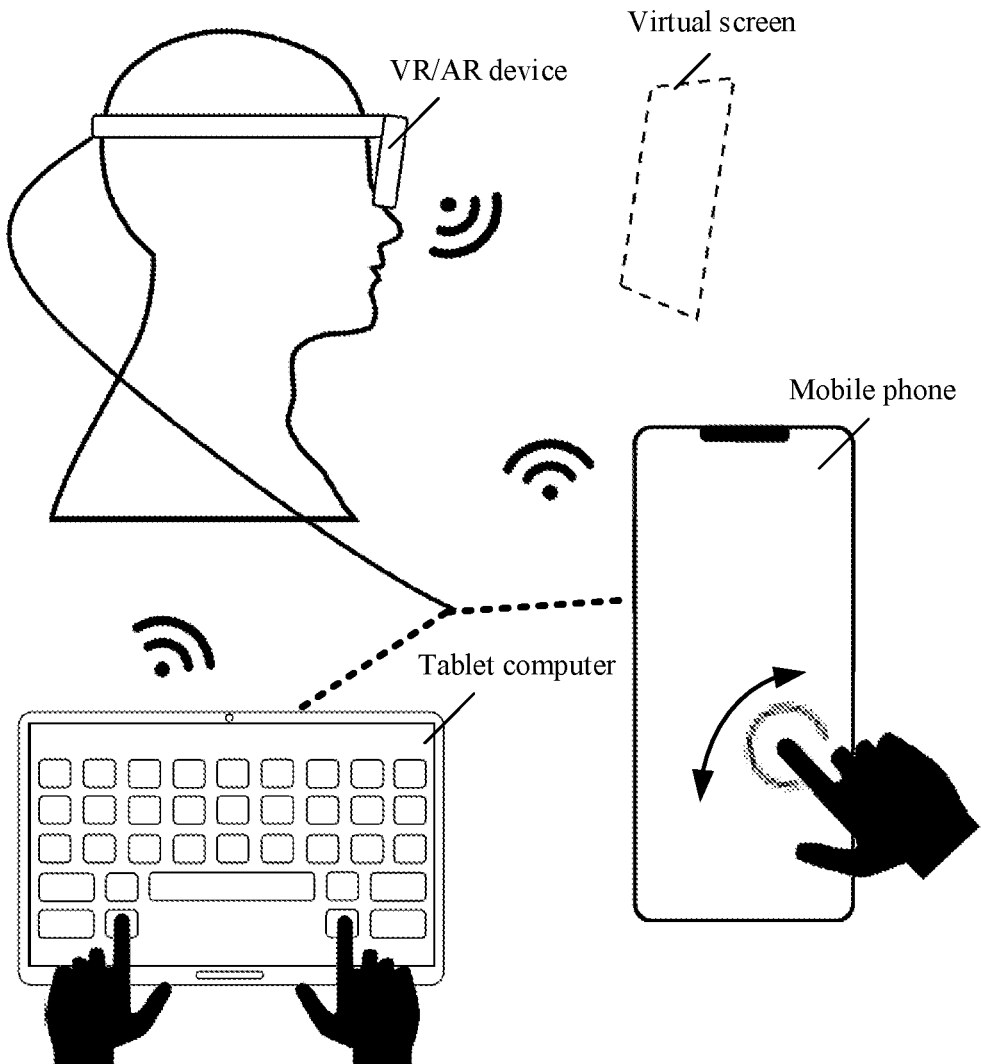
FIG. 5 is a schematic diagram of a scenario in which a VA/AR device is connected to both a tablet computer and a mobile phone in an interaction system according to an embodiment of this application.

For example, refer to FIG. 5. An example in which a VA/AR device is connected to a tablet computer and a mobile phone is used. As shown in FIG. 5, a virtual keyboard interface used to enter a character may be displayed on a display of the tablet computer connected to the VR/AR device, and a virtual touchpad interface used to input a touch operation may be displayed on a display of the mobile phone connected to the VR/AR device. In this case, the user can enter the character by using the virtual keyboard interface on the display of the tablet computer, and input the touch operation by using the virtual touchpad interface on the display of the mobile phone.

Figure 6:
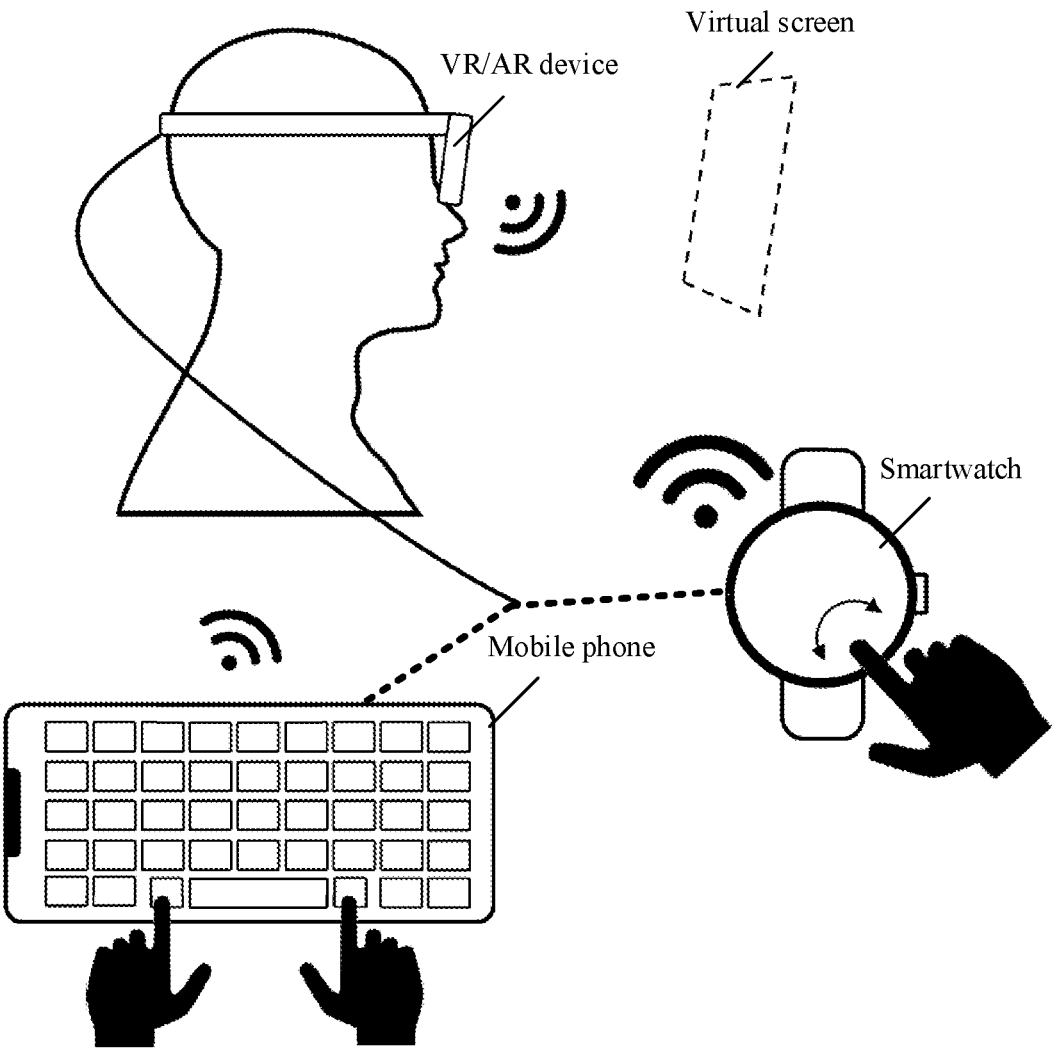
FIG. 6 is a schematic diagram of a scenario in which a VA/AR device is connected to both a mobile phone and a smartwatch in an interaction system according to an embodiment of this application.

For another example, refer to FIG. 6. An example in which a VA/AR device is connected to a mobile phone and a smartwatch is used. As shown in FIG. 6, a virtual keyboard interface used to enter a character may be displayed on a display of the mobile phone connected to the VR/AR device, and a virtual touchpad interface used to input a touch operation may be displayed on a display of the smartwatch connected to the VR/AR device. In this case, the user may enter the character by using the virtual keyboard interface on the display of the mobile phone, and input the touch operation by using the virtual touchpad interface on the display of the smartwatch.

It should be noted that the VR/AR device reads a relative size of a display of an electronic device connected to the VR/AR device, and automatically configures an interaction interface corresponding to the electronic device. For example, in a device combination of a mobile phone and a tablet computer, after obtaining sizes of displays of the mobile phone and the tablet computer, the VR/AR device automatically sets the virtual keyboard interface to be displayed on the display of the tablet computer (the size of the display is large), and the virtual touchpad interface to be displayed on the display of the mobile phone (the size of the display is small). For another example, in a device combination of a mobile phone and a smartwatch, after obtaining sizes of displays of the mobile phone and the smartwatch, the VR/AR device can automatically set the virtual keyboard interface to be displayed on the display of the mobile phone (the size of the display is large), and the virtual touchpad interface to be displayed on the display of the smartwatch (the size of the display is small). In addition, after completing automatic setting, the VR/AR device may further send a message to the user for confirmation. If the user confirms the setting, the VR/AR device performs the setting based on the automatic setting; otherwise, the VR/AR device performs the setting based on selection of the user.

For example, after reading a size of the electronic device, the VR/AR device reports the information to the user for selection. The user may choose to use a mobile phone as a keyboard input to display the virtual keyboard interface, and use a tablet as a touch or handwriting/painting input to display the virtual touchpad interface. In a use process, the user can set different interaction interfaces on different electronic devices at any time, that is, can perform automatic configuration or support manual configuration by the user.

At least two interaction interfaces used to input different interaction operations are generated in a display area of an electronic device connected to VA/AR glasses, so that a user can directly input different types of interaction operations on the electronic device, to meet interaction requirements of graphical interface positioning and text input, and a requirement of a mobile office.

In some embodiments of this application, the VR/AR device may be a head mounted display (head mounted display, HMD). The head mounted display may implement a plurality of different effects such as virtual reality, augmented reality, and mixed reality (mixed reality, MR). Common head mounted displays include but are not limited to devices such as VR glasses, AR glasses, a VR helmet, an AR helmet, and VR/AR glasses.

In some embodiments of this application, the electronic device 12 may be a portable electronic device including touch control and display functions, such as a mobile phone, a tablet computer, and an intelligent wearable device, for example, a smartwatch or a smart band. The electronic device may alternatively be a laptop (laptop) with a touch-sensitive surface (for example, a touch panel). In some other embodiments of this application, the electronic device may not be a portable electronic device, but a desktop computer with a touch-sensitive surface (for example, a touch panel).

It should be noted that, in embodiments of this application, electronic devices such as the mobile phone, the tablet computer, the smartwatch, and the smart band are merely used as examples, and are not limited to the electronic devices. A connection between another device including a touch function and a display function screen and the VR/AR device (such as a touch display or a touch panel with a display) and implementation of the connection by using the interaction method provided in this application shall fall within the protection scope of this application.

It should be further noted that collaborative interaction between the plurality of electronic devices and the VR/AR device mentioned in this application is not limited to two same/different electronic devices, and a system for interaction between three or more same/different electronic devices and the VR/AR device also falls within the protection scope of this application. In addition, a combination/composition form of a single-terminal keyboard, a touch area, and a multi-terminal cooperative touch and keyboard for interaction with the VR/AR device is not limited to an example of this application, and another combination form also falls within the protection scope of this application. Various keyboard layouts (for example, keys and touch interaction using a virtual joypad of an electronic device) and methods for switching between touch, a keyboard, and other interaction methods in this application shall fall within the protection scope of this application. Another interaction solution generated by using a combination manner of this solution and a combination between these solutions may also fall within the protection scope of this application.

To more intuitively describe an implementation principle and beneficial effects of the interaction system provided in embodiments of this application, the VR/AR device 11 may be VR/AR glasses, and the electronic device 12 may be a mobile phone.

Figure 7:
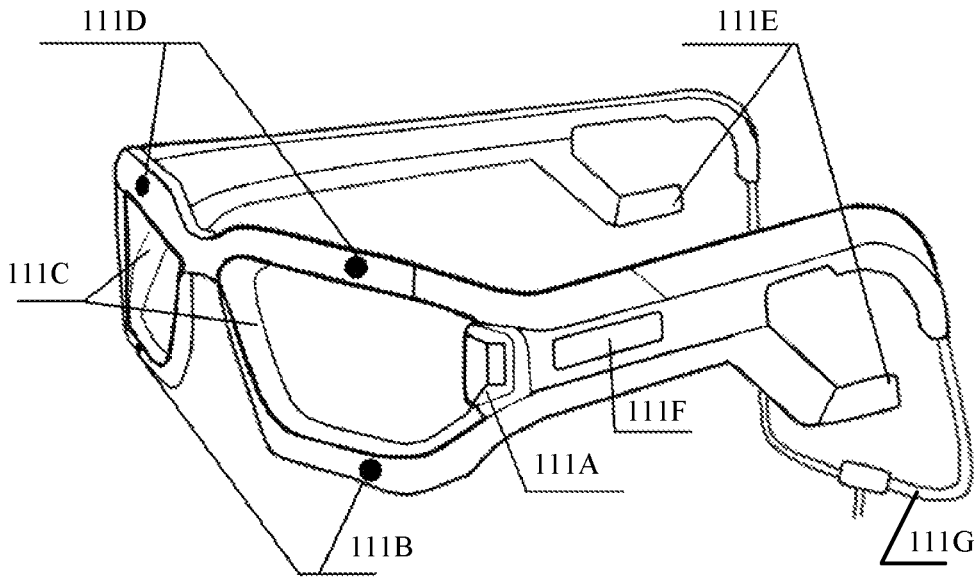
FIG. 7 is a schematic diagram of a structure of VR/AR glasses in an interaction system according to an embodiment of this application.

FIG. 7 is a schematic diagram of a structure of VR/AR glasses in an interaction system according to an embodiment of this application. As shown in FIG. 7, the VR/AR glasses may include a projector 111A, a binocular infrared gesture recognition camera 111B, an eye tracker 111C, a binocular front wide-angle camera 111D, an acceleration sensor 111E, a bone conduction headset and a noise reduction microphone 111F, a connection cable 111G, a control module (not shown in the figure), and a wireless communication module (not shown in the figure).

The projector 111A, the binocular infrared gesture recognition camera 111B, the eye tracker 111C, the binocular front wide-angle camera 111D, the acceleration sensor 111E, the bone conduction headset, and the noise reduction microphone 111F are separately configured in the VR/AR glasses.

The projector 111A is configured to project a virtual screen. The binocular infrared gesture recognition camera 111B is configured to photograph and recognize a gesture action of a user, and the eye tracker 111C is configured to capture a position of an intersection point focused by eyes of the user, to implement eye tracking interaction. The binocular front wide-angle camera 111D is configured to photograph a current environment and construct a virtual image of the current environment. The acceleration sensor 111E is configured to detect a head posture of the user. The bone conduction headset and the noise reduction microphone 111F are configured to play voice data of a call peer end and receive voice data input by the user. The connection cable 111G is configured to connect the VR/AR glasses to another electronic device. The foregoing control modules may control each functional component of the VR/AR glasses based on various types of control information. For example, the optical fiber scanning projector 111A is controlled to project the virtual screen, the binocular front wide-angle camera 111D is controlled to photograph the current environment and generate a corresponding virtual image and the like based on the photographed environment, and the display content on the virtual screen is controlled to perform a corresponding action based on an interaction operation.

In embodiments of this application, the VR/AR glasses may establish a communication connection to the mobile phone by the connection cable 111G, or may establish the communication connection to the mobile phone by the wireless communication module.

Figure 8:
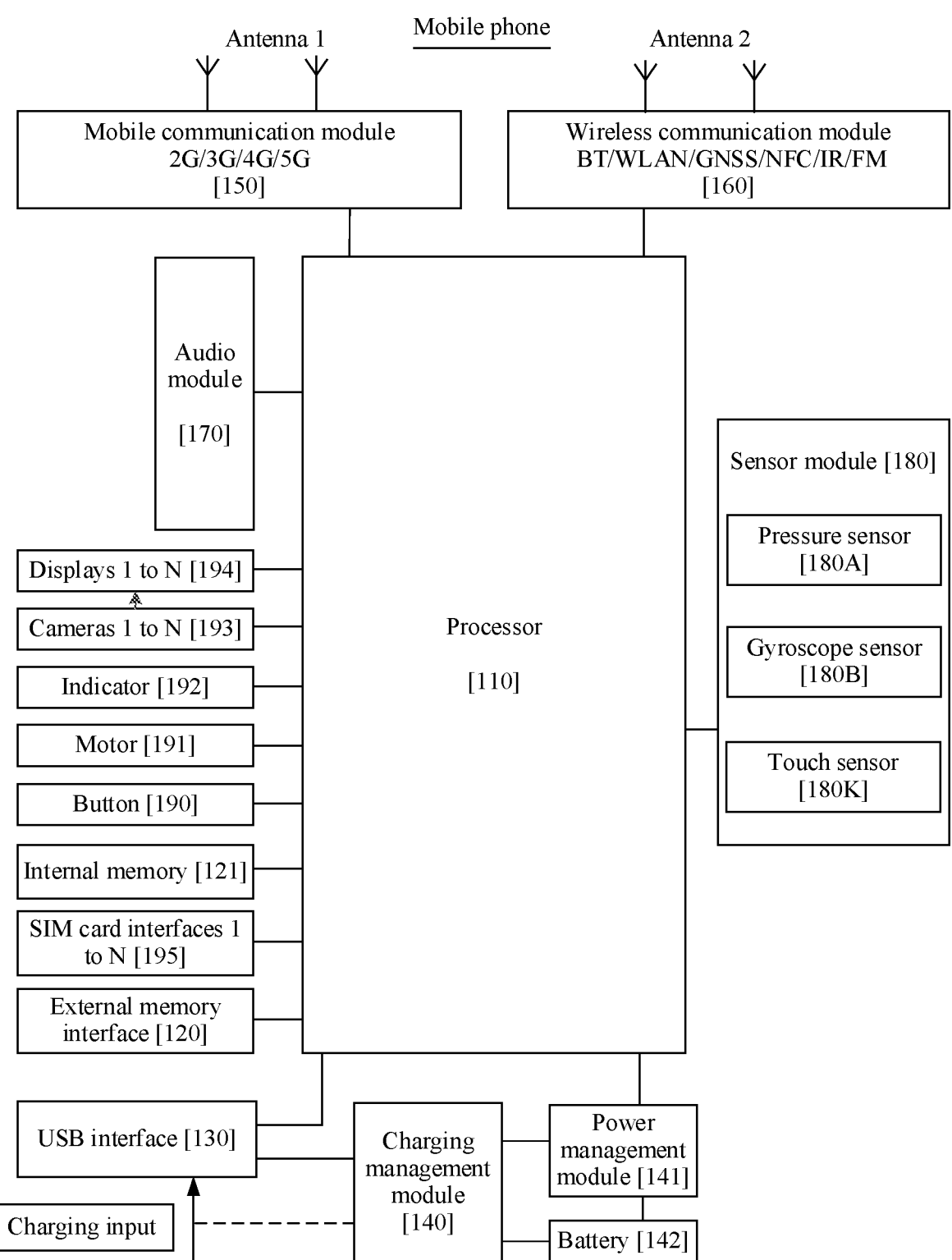
FIG. 8 is a schematic diagram of a hardware structure of a mobile phone in an interaction system according to an embodiment of this application.

FIG. 8 is a schematic diagram of a structure of a mobile phone in an interaction system according to an embodiment of this application. As shown in FIG. 8, the mobile phone may include: a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170 (the audio module 170 may include a speaker, a receiver, a microphone, a headset jack (not shown in the figure), a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a touch sensor 180K, and the like.

It can be understood that the structure shown in this embodiment of the present invention does not constitute a specific limitation on the mobile phone. In some other embodiments of this application, the mobile phone may include more or fewer components than those shown in the figure, or may combine some components, or may split some components, or may have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile phone.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the display 194 through the DSI interface, to implement a display function of the mobile phone.

It may be understood that an interface connection relationship between the modules shown in this embodiment of the present invention is merely an example for description, and does not constitute a limitation on the structure of the mobile phone. In some other embodiments of this application, the mobile phone may alternatively use an interface connection manner different from that in the foregoing embodiment, or a combination of a plurality of interface connection manners.

A wireless communication function of the mobile phone may be implemented by using the antenna 1, the antenna 2, the mobile communication module 150, the wireless communication module 160, the modem processor, the baseband processor, and the like. In some embodiments, the mobile phone may implement a wireless connection to the VR/AR glasses by using the antenna 1, the antenna 2, the mobile communication module 150, the wireless communication module 160, the modem processor, and the baseband processor.

The wireless communication module 160 may provide a solution, applied to the mobile phone, to wireless communication including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the mobile phone, the antenna 1 and the mobile communication module 150 are coupled, and the antenna 2 and the wireless communication module 160 are coupled, so that the mobile phone can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a Beibou navigation satellite system (Beibou navigation satellite system, BDS), a quasi-zenith satellite system (quasi-zenith satellite system, QZSS), and/or a satellite based augmentation system (satellite based augmentation system, SBAS).

The mobile phone implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the mobile phone may include one or N displays 194, where N is a positive integer greater than 1. In this embodiment of this application, the mobile phone may display different types of interaction interfaces on the display of the mobile phone.

The internal memory 121 may be configured to store computer-executable program code. The executable program code includes instructions. The internal memory 121 may include a program storage area and a data storage area. The program storage area may store an operating system, an application required by at least one function (for example, an image playback function), and the like. The data storage area may store data (for example, audio data or an address book) created during use of the mobile phone, and the like. In addition, the internal memory 121 may include a high-speed random access memory, or may include a nonvolatile memory, for example, at least one magnetic disk storage device, a flash memory device, or a universal flash storage (universal flash storage, UFS). The processor 110 runs the instructions stored in the internal memory 121 and/or instructions stored in a memory disposed in the processor, to perform various function applications and data processing of the mobile phone.

The pressure sensor 180A is configured to sense a pressure signal, and can convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The mobile phone determines pressure intensity based on the change of the capacitance. When a touch operation is performed on the display 194, the mobile phone detects intensity of the touch operation by using the pressure sensor 180A. The mobile phone may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 180B may be configured to determine a motion posture of the mobile phone. In some embodiments, an angular velocity of the mobile phone around three axes (namely, x, y, and z axes) may be determined by using the gyroscope sensor 180B. The gyroscope sensor 180B may be configured to implement image stabilization during photographing. For example, when a shutter is pressed, the gyroscope sensor 180B detects an angle at which the mobile phone jitters, obtains, through calculation based on the angle, a distance for which a lens module needs to compensate, and allows a lens to cancel the jitter of the mobile phone through reverse motion, to implement image stabilization. The gyroscope sensor 180B may also be used in a navigation scenario and a somatic game scenario. In some embodiments, a 3dof or 6dof handle function may be implemented by performing a game operation such as rotation and movement of the mobile phone.

The touch sensor 180K is also be referred to as a touch device. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may be alternatively disposed on a surface of the mobile phone and is at a location different from that of the display 194. In this embodiment of this application, the mobile phone may receive, by using the pressure sensor, the gyroscope sensor, and the touch sensor, an interaction operation input by a user.

Figure 9:
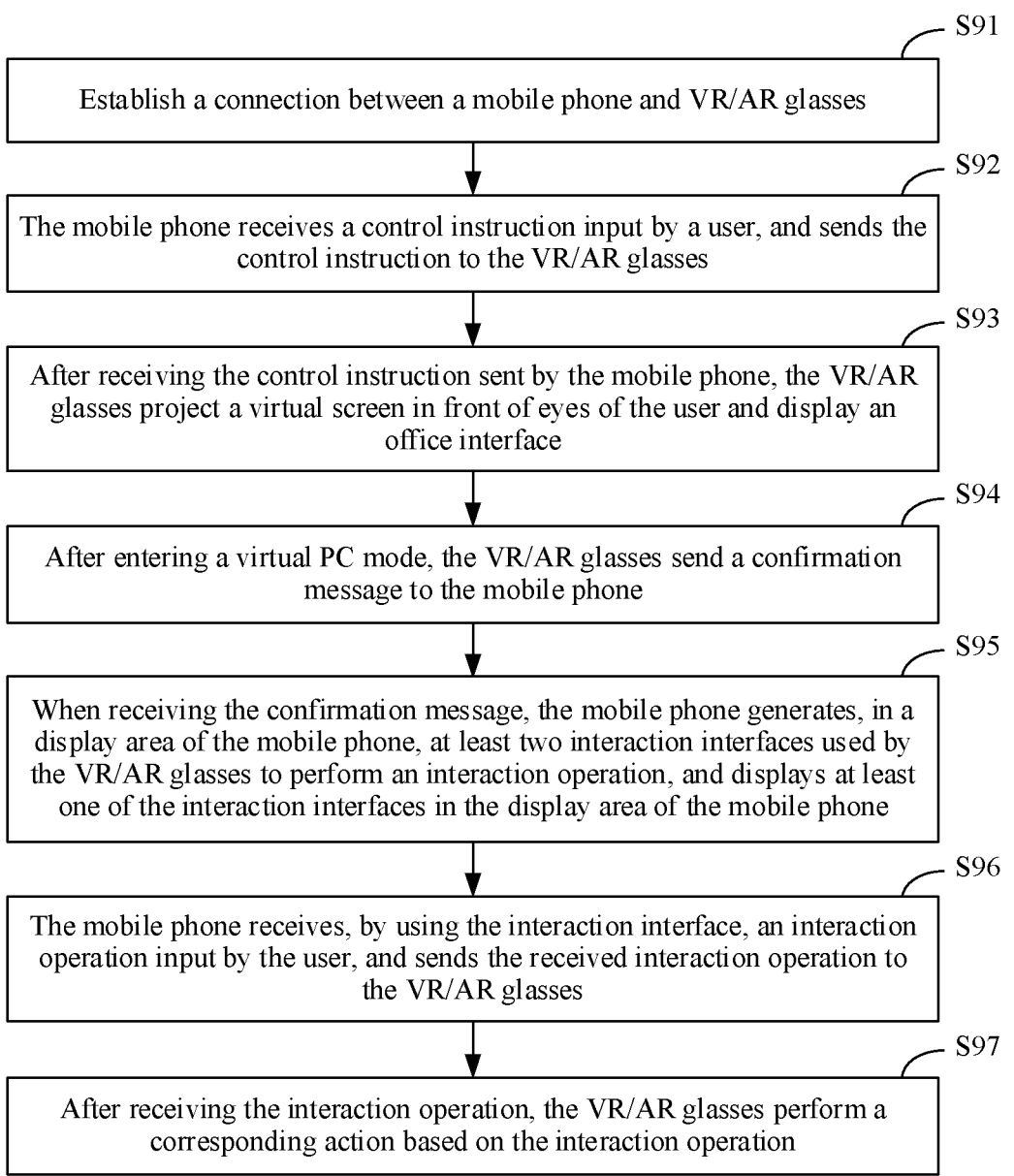
FIG. 9 is a flowchart of implementing an interaction method for a VR/AR device according to an embodiment of this application.

The following describes the interaction method provided in embodiments of this application by using the mobile phone and the VR/AR glasses as execution bodies. To describe the interaction method provided in embodiments of this application more clearly, FIG. 9 is a flowchart of implementing an interaction method for a VR/AR device according to an embodiment of this application. The interaction method may include S91 to S97. Details are as follows:

S91: Establish a connection between the mobile phone and the VR/AR glasses.

In this embodiment of this application, the mobile phone may be connected to the VR/AR glasses in a wireless/wired connection manner.

For example, the VR/AR glasses may be connected to an electronic device by using a VR connection cable/AR connection cable. Certainly, the VR/AR device and the electronic device may also be interconnected based on a wireless communication network. The wireless communication network may be a local area network, or may be a wide area network transferred by using a relay (relay) device. When the communication network is a local area network, for example, the communication network may be a short-range communication network such as a Wi-Fi hotspot network, a Zigbee network, or a near field communication (near field communication, NFC) network. When the communication network is a wide area network, for example, the communication network may be a 3rd-generation mobile communication technology (3rd-generation mobile communication technology, 3G) network, a 4th generation mobile communication technology (4th generation mobile communication technology, 4G) network, a 5th-generation mobile communication technology (5th-generation mobile communication technology, 5G) network, a future evolved public and mobile network (public and mobile network, PLMN), or the Internet. It may be understood that the communication network and a service scenario described in embodiments of this application are intended to describe the technical solutions in embodiments of this application more clearly, and do not constitute a limitation on the technical solutions described in embodiments of this application.

S92: The mobile phone receives a control instruction input by a user, and sends the control instruction to the VR/AR glasses.

The control instruction is used to control the VR/AR glasses to enter a virtual PC mode.

In this embodiment of this application, after establishing the connection to the VR/AR glasses, the mobile phone can send, to the VA/AR glasses, a control instruction for controlling the VR/AR glasses to enter the virtual PC mode, to control the VR/AR glasses to enter the virtual PC mode. Specifically, the mobile phone may generate a corresponding control instruction based on an operation performed by the user on the mobile phone, and send the generated control instruction to the VR/AR glasses connected to the mobile phone.

The following describes an example of a process in which the mobile phone generates the corresponding control instruction based on the operation performed by the user on the mobile phone.

Figure 10:
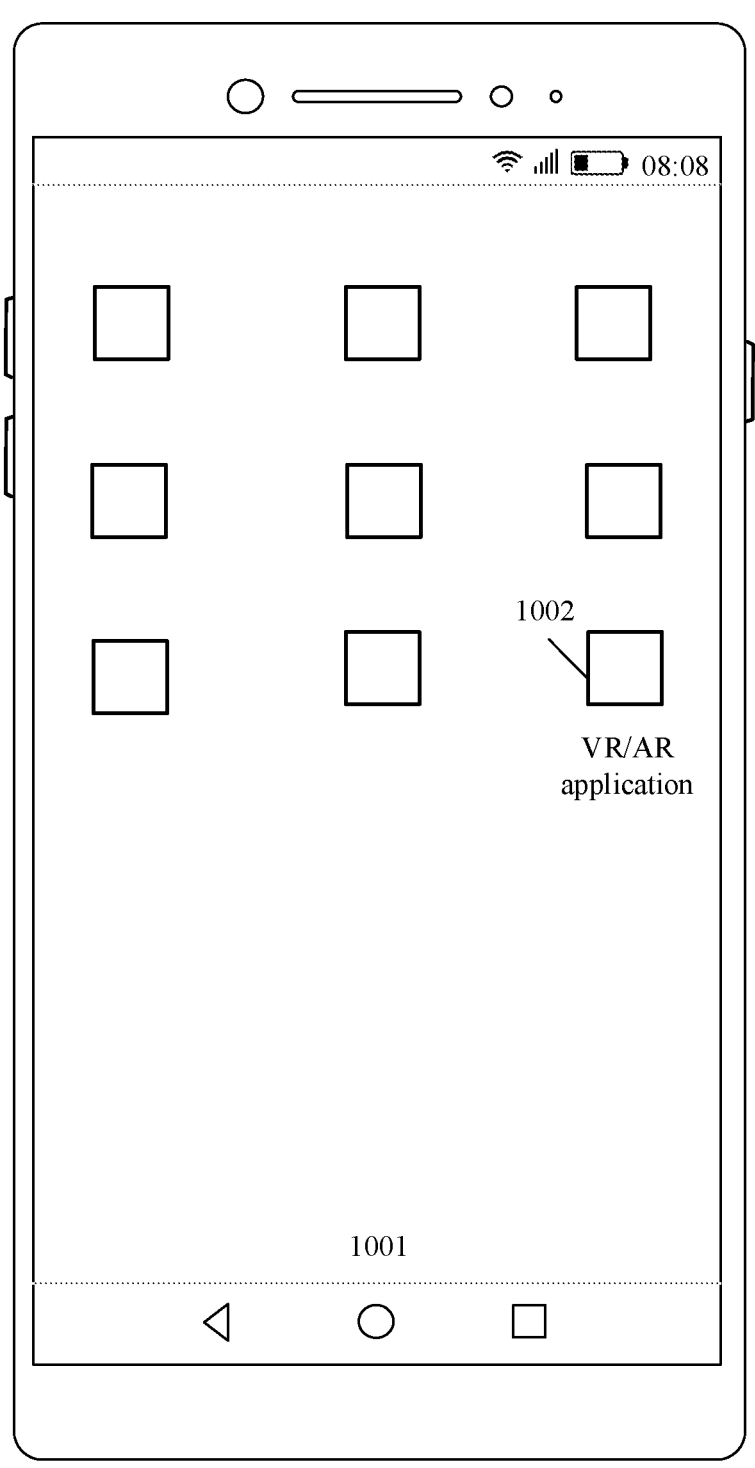
FIG. 10 is a schematic diagram of a graphical user interface of a mobile phone in an interaction system according to an embodiment of this application.
Figure 11:
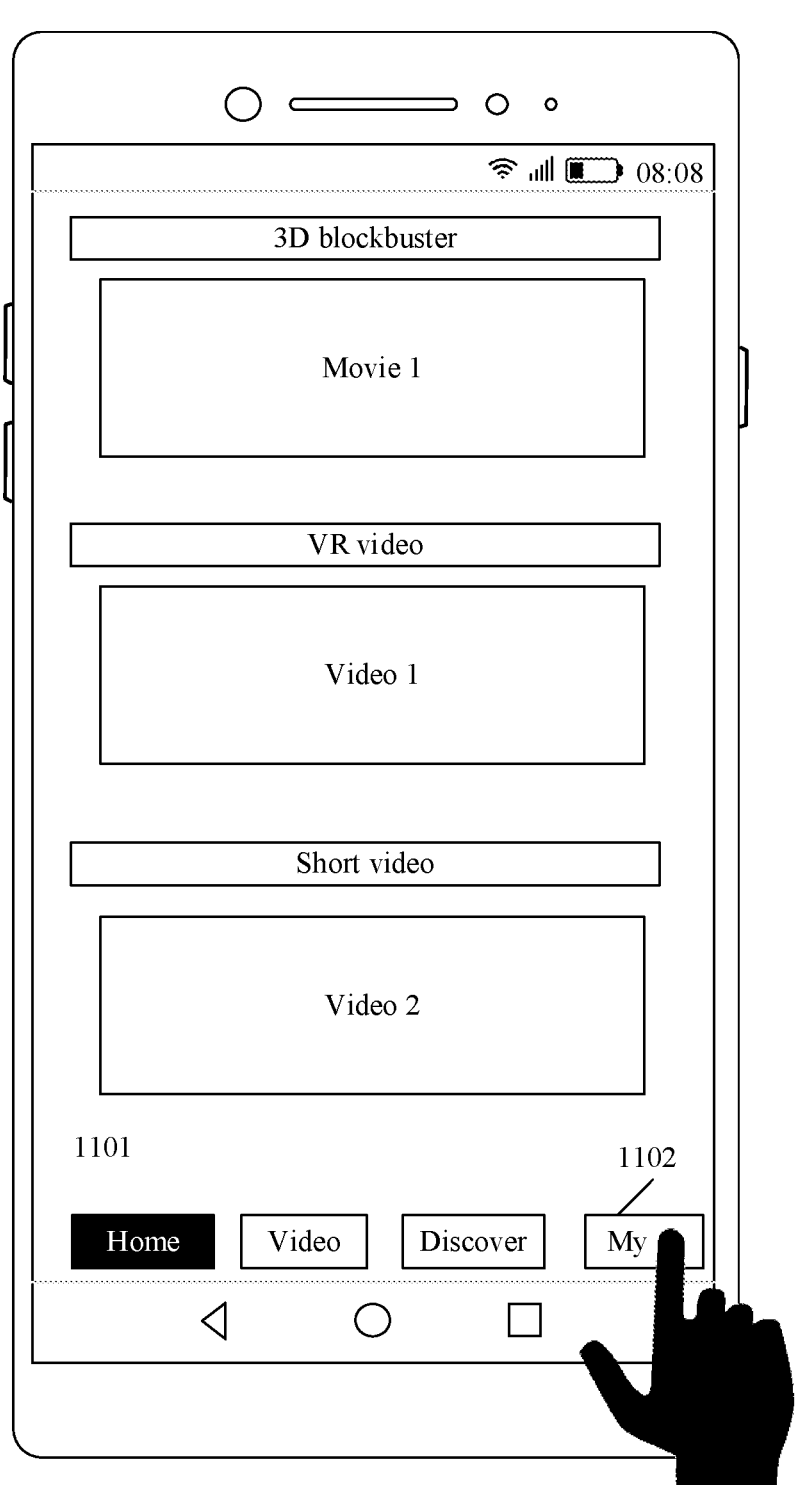
FIG. 11 is another schematic diagram of a graphical user interface of a mobile phone in an interaction system according to an embodiment of this application.
Figure 12A:
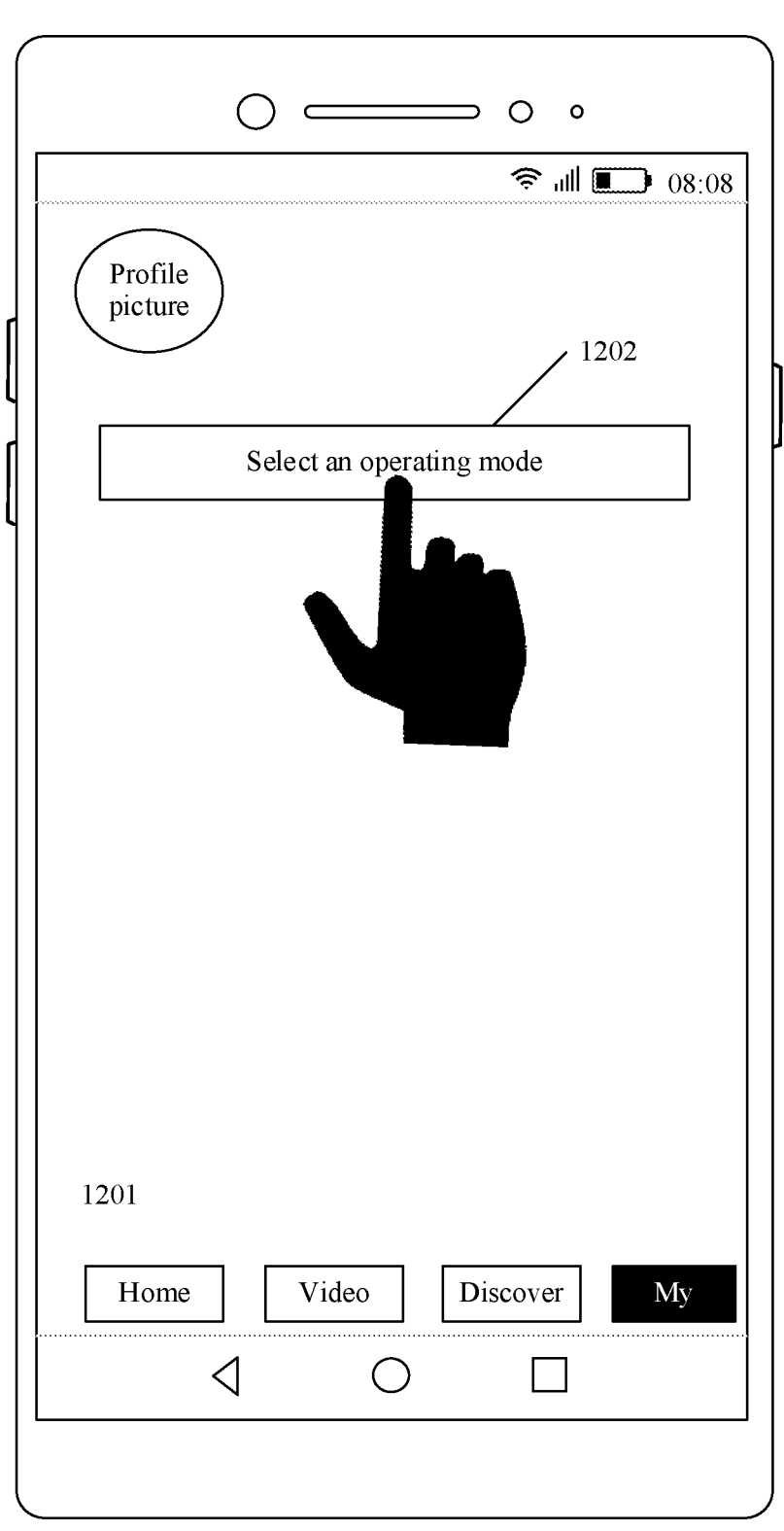
FIG. 12(a) and FIG. 12(b) are still another schematic diagram of graphical user interfaces of a mobile phone in an interaction system according to an embodiment of this application.
Figure 12B:
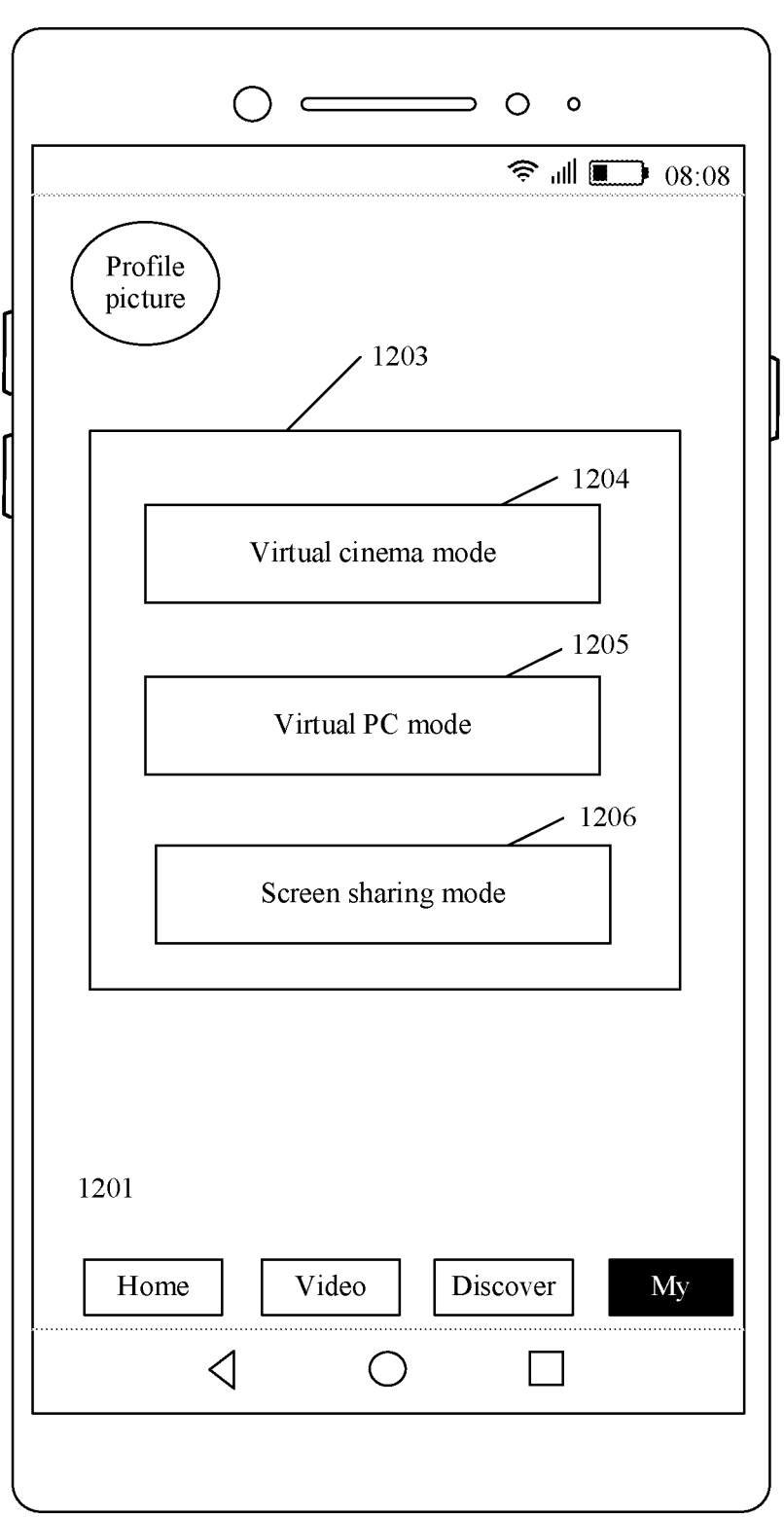

FIG. 10 is a schematic diagram of a graphical user interface of a desktop 1001 of a mobile phone according to an embodiment of this application. When the user wants to control the VR/AR glasses to enter the virtual PC mode, the user may tap a VR/AR application (Application, APP) 1002 on the desktop 1001 to start the VR/AR application. That is, after detecting an operation that the user taps the VR/AR application 1002 on the desktop 1001, the mobile phone starts the VR/AR application. In this case, an interface displayed on a display of the mobile phone jumps to an operation interface 1101 shown in FIG. 11. The operation interface 1101 is an operation interface when the VR/AR application operates. As shown in FIG. 11, the operation interface 1101 includes a "My" control 1102. The user taps the "My" control 1102, so that the display of the mobile phone displays a display interface 1201 shown in FIG. 12(*a*) and FIG. 12(*b*). The display interface 1201 is a display interface corresponding to the "My" control 1102. As shown in FIG. 12(*a*), the display interface 1201 may include an operating mode selection control 1202. After the user taps the operating mode selection control 1202, a my operating mode selection list 1203 is displayed. The my operating mode selection list 1203 may include a plurality of option controls such as a virtual cinema mode selection control 1204, a virtual PC mode selection control 1205, and a screen sharing mode selection control 1204 (as shown in FIG. 12(*b*)). The user may select, by using these selection controls, an operating mode that the VR/AR glasses need to enter. Herein, to enable the VR/AR glasses to enter the virtual PC mode, the user may tap the virtual PC mode selection control 1205. After the mobile phone detects that the user taps the virtual PC mode selection control 1205, the mobile phone generates a corresponding control instruction, and sends the control instruction to the VR/AR device connected to the mobile phone, so that the VR/AR glasses enter the virtual PC mode.

S93: After receiving the control instruction sent by the mobile phone, the VR/AR glasses project a virtual screen in front of eyes of the user, and display an office interface.

In this embodiment of this application, the VR/AR glasses receive the control instruction, so that the VR/AR glasses are controlled to enter the virtual PC mode. Specifically, a virtual screen may be projected by using a projector of the VR/AR glasses, then an office interface of a personal computer that needs to be operated is obtained, and the office interface is displayed on the virtual screen.

The VR/AR glasses may further enable a perspective function of a binocular front wide-angle camera. In this case, the user may see a real scene of an external environment by using the binocular front wide-angle camera, and then the binocular front wide-angle camera displays a virtual screen in front of the user. The virtual screen displays an office interface of a personal computer that needs to be operated.

In this embodiment of this application, a size, a distance, a placement location, and a direction of the virtual screen may be adjusted based on a user requirement. For example, the user may perform adjustment by using an electronic device connected to the VR/AR device. It should be understood that a method for adjusting the size, the distance, the placement location, and the direction of the virtual screen is an existing method in the field, and is not further described herein in this application.

S94: After entering the virtual PC mode, the VR/AR glasses send a confirmation message to the mobile phone.

In this embodiment of this application, when the electronic device is already connected to the VR/AR glasses, the VR/AR glasses may also send a message to the mobile phone. After the VR/AR glasses enter the virtual PC mode, the VR/AR glasses send the confirmation message to the mobile phone to notify the mobile phone that the VR/AR glasses enter the virtual PC mode.

S95: When receiving the confirmation message, the mobile phone generates, in a display area of the mobile phone, at least two interaction interfaces used by the VR/AR glasses to perform an interaction operation, and displays at least one of the interaction interfaces in the display area of the electronic device.

The mobile phone may detect, by detecting whether to receive the confirmation message that is sent by the VR/AR glasses and that indicates that the VR/AR glasses enter the virtual PC mode, whether the VR/AR glasses enter the virtual PC mode. That is, when receiving the confirmation message sent by the VR/AR glasses and used to notify the VR/AR glasses that the VR/AR glasses enter the virtual PC mode, the mobile phone may determine that the VR/AR glasses enter the virtual PC mode.

When it is determined that the VR/AR glasses enter the virtual PC mode, the mobile phone generates, in the display area of the mobile phone, the at least two interaction interfaces used by the VR/AR device to perform the interaction operation, and displays, in the display area of the mobile phone, the at least one of the interaction interfaces. In this way, the user can input a corresponding interaction operation in the interaction interface generated by the mobile phone, to implement interaction.

The interaction interface includes but is not limited to a virtual touchpad interface, a virtual keyboard interface, and a joypad interface. The virtual touchpad interface is used to receive a touch operation input by a user, the virtual keyboard interface is used to receive a character entered by the user, and the joypad interface is used to receive a game operation input by the user.

In this embodiment of this application, when the mobile phone determines that the VR/AR glasses enter the virtual PC mode, the mobile phone generates a virtual touchpad interface and a virtual keyboard interface in the display area of the mobile phone, and simultaneously displays the virtual touchpad interface and the virtual keyboard interface on the display of the mobile phone.

In this way, the user may input touch operations such as positioning, dragging, and zooming on the virtual touchpad interface, or may enter a character on the virtual keyboard interface. In addition, the user may further use the virtual touchpad interface as a handwriting pad, and enter a character on the virtual touchpad interface by using a hand or a touch pen, or may use the virtual touchpad interface as a drawing pad, and input a picture on the virtual touchpad interface.

In this embodiment of this application, when the mobile phone determines that the VA/AR glasses enter the virtual PC mode, the mobile phone generates a plurality of interaction interfaces such as the virtual touchpad interface, the virtual keyboard interface, and the joypad interface in the display area of the mobile phone. However, in this case, only one of the interaction interfaces is displayed on the display of the mobile phone, and other interaction interfaces are hidden. Herein, the mobile phone may determine, based on a switching operation input by the user, an interaction interface displayed by the mobile phone. In this way, the user can switch the displayed interaction interface based on a requirement.

In this embodiment of this application, the switching operation may be a specific operation preset by the user. Specifically, the switching operation may be pressing a specific key or a specific touch gesture, or may be a combination of the two. This is not limited herein. For example, the switching operation may be pressing a specific key on the virtual keyboard. For another example, the switching operation may be a touch gesture such as sliding a screen rightward or leftward.

For example, the interaction interface of the mobile phone can be switched from the virtual keyboard interface to the joypad interface or the virtual touchpad interface by pressing the specific key on the virtual keyboard. Alternatively, the interaction interface of the mobile phone can be switched from the virtual touchpad interface to the joypad interface or the virtual keyboard interface by using the specific touch gesture on the virtual touchpad interface. Alternatively, the interaction interface of the mobile phone can be switched from the joypad interface to the virtual touchpad interface or the virtual keyboard interface by using the specific touch gesture.

In this embodiment of this application, in addition to switching between interaction interfaces, a composite operation scenario may be further implemented. That is, the composite operation scenario is implemented by using a specific composite wakeup operation on an interaction interface. The specific composite wakeup operation may be set based on a use habit of the user. This is not limited herein.

S96: The mobile phone receives, by using the interaction interface, an interaction operation input by the user, and sends the received interaction operation to the VR/AR glasses.

When the user inputs the interaction operation by using the interaction interface generated in the display area of the mobile phone, a pressure sensor, a touch sensor, and a gyroscope sensor of the mobile phone can receive the interaction operation input by the user.

In a specific application, the pressure sensor, the touch sensor, and the gyroscope sensor of the mobile phone can receive touch information of the interaction operation input by the user, and determine, based on the received touch information, the interaction operation input by the user.

S97: After receiving the interaction operation, the VR/AR glasses perform a corresponding action based on the interaction operation.

After receiving the interaction operation, the VR/AR glasses perform, on a virtual screen currently displayed by the VR/AR glasses, an action corresponding to the interaction operation.

The VR/AR glasses may parse the received interaction operation by using a control module of the VR/AR glasses, determine the action corresponding to the interaction operation, and then perform the corresponding action on the virtual screen, to implement interaction. It should be noted that a correspondence between the interaction operation and the action corresponding to the interaction operation can be preset based on an operation habit of the user. For example, an action corresponding to a sliding operation is preset as controlling a cursor to move, a moving distance is related to a sliding distance (for example, linear correlation), and a moving direction is consistent with a sliding direction. An action corresponding to a character entering operation is to enter a corresponding character at a location of the cursor. Details are not described herein again.

For example, when the interaction operation received by the VR/AR glasses is the sliding operation, the sliding distance of the sliding operation is X, and a sliding direction is sliding upward, it can be determined, by using the preset correspondence, that a to-be-performed action is moving a moving cursor upward, and a moving distance is Y. The moving distance Y may be determined based on the sliding distance X, and the VR/AR glasses perform the action on the virtual screen, to implement interaction.

For another example, when the interaction operation received by the VR/AR glasses is entering characters "ABCDEF", it may be determined that a to-be-performed action is entering the characters "ABCDEF" at the location of the cursor on the virtual screen, and then the action is performed on the virtual screen, to implement character entering.

Figure 13A:
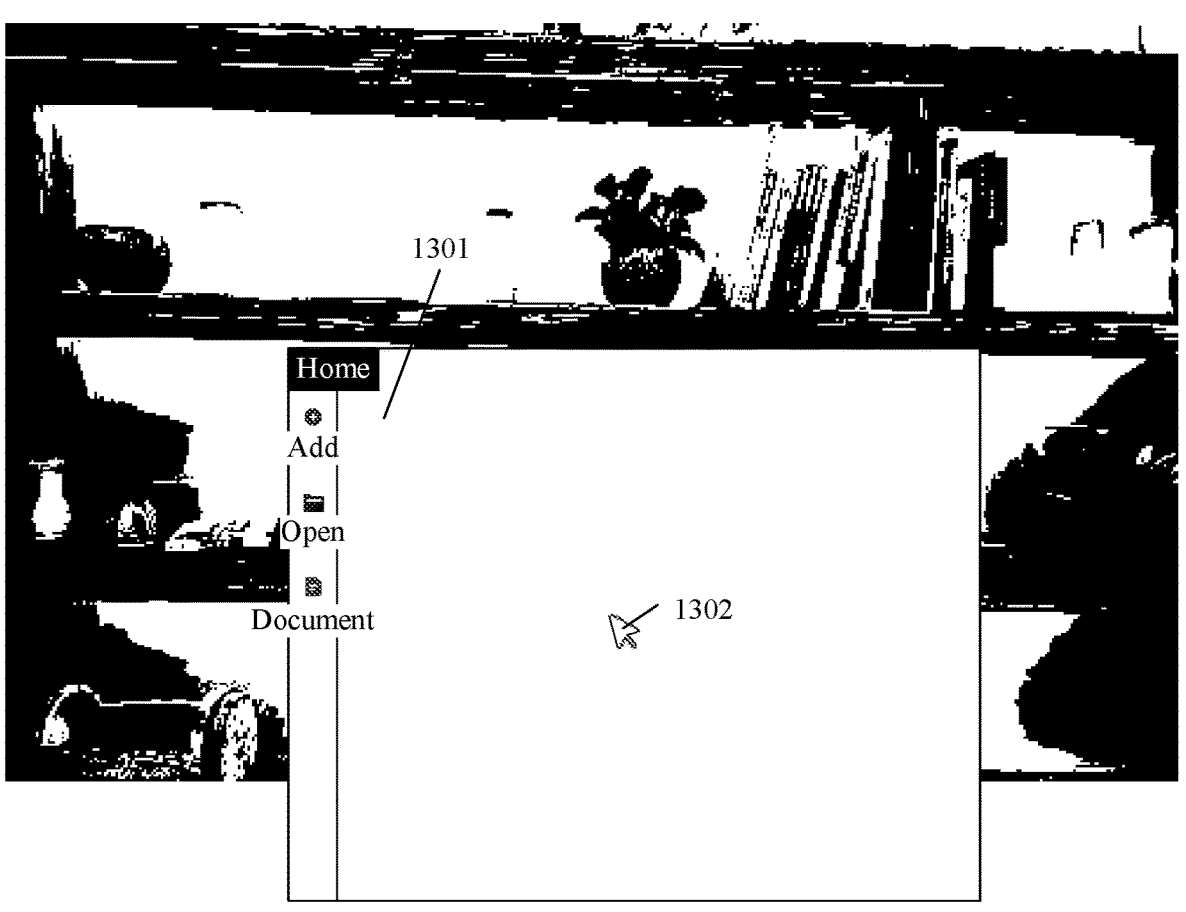
FIG. 13(a) and FIG. 13(b) are a schematic diagram of interaction interfaces for an interaction method according to an embodiment of this application.
Figure 13A:
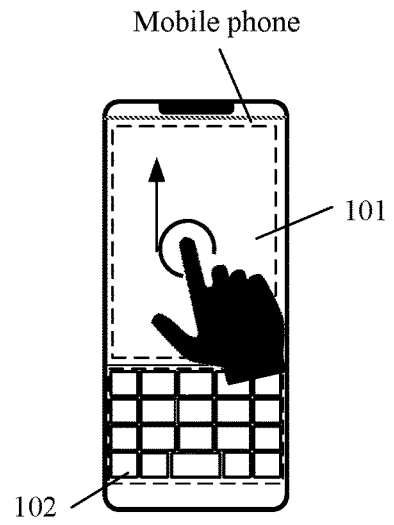
Figure 13B:
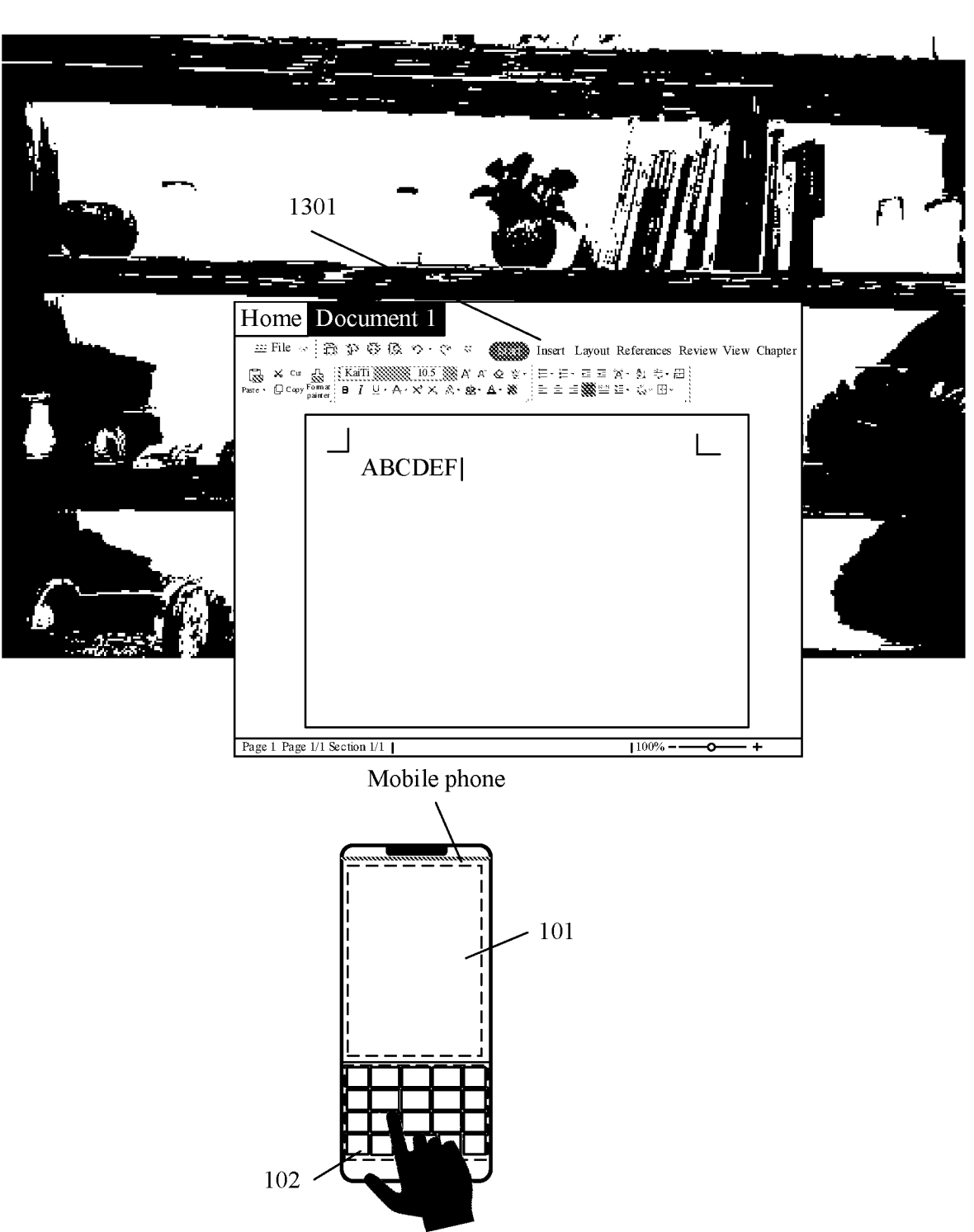

To describe beneficial effects of the interaction method in embodiments of this application more intuitively, refer to FIG. 13(a) and FIG. 13(b). FIG. 13(a) and FIG. 13(b) are schematic diagrams of an interaction interface of a device interaction method according to an embodiment of this application. In this embodiment of this application, after entering the virtual PC mode, the VR/AR device may project a virtual screen 1301, and display an office interface on the virtual screen 1301. As shown in FIG. 13(a), the user may control movement of a cursor arrow 1302 on the virtual screen by inputting a sliding gesture on the virtual touchpad interface 101 generated and displayed in the display area of the mobile phone.

As shown in FIG. 13(b), the user may input the characters "ABCDEF" in a virtual keyboard area 102 generated and displayed by the mobile phone. In this case, the VR/AR device also displays the characters "ABCDEF" in a character entering area on the virtual screen.

In conclusion, according to the interaction method for the VR/AR device provided in embodiments of this application, at least two interaction interfaces used by the VR/AR device to perform an interaction operation can be generated by using an electronic device having a display and a touchpad, and at least one of the interaction interfaces can be displayed in a display area of the electronic device. In combination with the VR/AR device, the user can perform an operation on content on a virtual screen by inputting a plurality of interaction operations such as positioning, dragging, zooming, character entering, and a game operation on the interaction interface displayed in the display area of the electronic device, to improve interaction efficiency of the VR/AR device and meet complex interaction requirements in more scenarios. In addition, a plurality of devices such as an external keyboard, an external mouse, and an external handle do not need to be additionally configured. This effectively improves convenience of a mobile office.

It may be understood that sequence numbers of the steps do not mean execution sequences in the foregoing embodiments. The execution sequences of the processes should be determined based on functions and internal logic of the processes, and this should not be construed as any limitation on the implementation processes of embodiments of this application.

Based on a same inventive concept, in an implementation of the foregoing method, embodiments of this application provide an electronic device. The electronic device embodiment corresponds to the foregoing method embodiment. For ease of reading, details in the foregoing method embodiment are not described one by one in this embodiment. However, it should be clarified that the apparatus in this embodiment can correspondingly implement all content in the foregoing method embodiment.

An embodiment of this application further provides a computer-readable storage medium. The computer-readable storage medium stores a computer program. When the computer program is executed by a processor, the steps in the interaction method can be implemented.

An embodiment of this application provides a computer program product. When the computer program product runs on a mobile terminal, the mobile terminal is enabled to implement the steps in the foregoing interaction method when executing the computer program product.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the methods in the foregoing method embodiments.

When the integrated unit is implemented in the form of a software functional unit and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium. When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry the computer program code to a terminal device, a recording medium, a computer memory, a read-only memory (ROM, Read-Only Memory), a random access memory (RAM, Random Access Memory), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
in response to detecting that a virtual reality (VR)/augmented reality (AR) device enters a predetermined operating mode of the VR/AR device:
generating, by an electronic device, at least two interaction interfaces used by the VR/AR device to perform an interaction operation, wherein the VR/AR device is connected to the electronic device, and
displaying at least one interaction interface of the at least two interaction interfaces in a display area of the electronic device;
receiving, by the electronic device, an interaction operation input by a user in the at least one interaction interface;
sending the interaction operation to the VR/AR device; and
performing, by the VR/AR device, a corresponding action in response to the interaction operation after the receiving the interaction operation.

2. The method according to claim 1, wherein the performing, by the VR/AR device, the corresponding action comprises:
after the receiving the interaction operation, performing, by the VR/AR device on a virtual screen currently displayed by the VR/AR device, an action corresponding to the interaction operation.

3. The method according to claim 1, wherein the at least one interaction interface comprises a virtual touchpad interface and a virtual keyboard interface, the virtual touchpad interface is used to receive a touch operation input by the user, and the virtual keyboard interface is used to receive a character entered by the user.

4. The method according to claim 3, wherein the at least one interaction interface further comprises a joypad interface, and the joypad interface is used to receive a game operation input by the user.

5. The method according to claim 1, wherein the method further comprises:
after the generating the at least two interaction interfaces used by the VR/AR device to perform the interaction operation, and after the displaying the at least one interaction interface of the interaction interfaces in the display area of the electronic device:
switching, by the electronic device, a currently displayed interaction interface based on a switching operation.

6. The method according to claim 1, wherein when at least two electronic devices are connected to the VR/AR device, the displaying the at least one interaction interface of the at least two interaction interfaces in the display area of the electronic device comprises:
after the detecting that the VR/AR device connected to the electronic device enters the predetermined operating mode, displaying, by the electronic device in the display area of the electronic device, the at least one interaction interface different from another interaction interface of another electronic device, wherein the at least two electronic devices connected to the VR/AR device include the electronic device and the another electronic device.

7. The method according to claim 1, the VR/AR device entering the predetermined operating mode comprising:

the VR/AR device switching from a first operating mode of the VR/AR device to the predetermined operating mode, the first operating mode being one of a virtual personal PC mode, a virtual cinema mode, a screen sharing mode, the predetermined operating mode being different from the first operating mode.

8. A method, comprising:

in response to detecting that a virtual reality (VR)/augmented reality (AR) device enters a predetermined operating mode of the VR/AR device:

generating, by an electronic device, at least two interaction interfaces used by the VR/AR device to perform an interaction operation, wherein the VR/AR device is connected to the electronic device, and displaying at least one interaction interface of the at least two interaction interfaces in a display area of the electronic device;

receiving, by the electronic device, an interaction operation input by a user in the at least one interaction interface; and sending, by the electronic device, the interaction operation to the VR/AR device, so that the VR/AR device performs a corresponding action in response to the interaction operation.

9. The method according to claim 8, wherein the at least one interaction interface comprises a virtual touchpad interface and a virtual keyboard interface, the virtual touchpad interface is used to receive a touch operation input by the user, and the virtual keyboard interface is used to receive a character entered by the user.

10. The method according to claim 9, wherein the at least one interaction interface further comprises a joypad interface, and the joypad interface is used to receive a game operation input by the user.

11. The method according to claim 8, wherein the method further comprises:

after the generating the at least two interaction interfaces used by the VR/AR device to perform the interaction operation, and after the displaying the at least one interaction interface of the interaction interfaces in the display area of the electronic device:

switching, by the electronic device, a currently displayed interaction interface based on a switching operation.

12. The method according to claim 8, wherein when at least two electronic devices are connected to the VR/AR device, the displaying the at least one interaction interface of the at least two interaction interfaces in the display area of the electronic device comprises:

after the detecting that the VR/AR device connected to the electronic device enters the predetermined operating mode, displaying, by the electronic device in the display area of the electronic device, the at least one interaction interface different from another interaction interface of another electronic device, wherein the at least two electronic devices connected to the VR/AR device include the electronic device and the another electronic device.

13. An electronic device, comprising:

at least one processor; and a memory storing a computer program, wherein the at least one processor is coupled to the memory, and when the at least one processor executes the computer program, the electronic device is enabled to perform operations including:

in response to detecting that a virtual reality (VR)/augmented reality (AR) device enters a predetermined operating mode of the VR/AR device:

generating at least two interaction interfaces used by the VR/AR device to perform an interaction operation, wherein the VR/AR device is connected to the electronic device, and displaying at least one interaction interface of the at least two interaction interfaces in a display area of the electronic device receiving an interaction operation input by a user in the at least one interaction interface; and sending the interaction operation to the VR/AR device, so that the VR/AR device performs a corresponding action in response to the interaction operation.

14. The electronic device according to claim 13, wherein the at least one interaction interface comprises a virtual touchpad interface and a virtual keyboard interface, the virtual touchpad interface is used to receive a touch operation input by the user, and the virtual keyboard interface is used to receive a character entered by the user.

15. The electronic device according to claim 14, wherein the at least one interaction interface further comprises a joypad interface, and the joypad interface is used to receive a game operation input by the user.

16. The electronic device according to claim 13, the operations further comprising:

after the generating the at least two interaction interfaces used by the VR/AR device to perform the interaction operation, and after the displaying the at least one interaction interface of the interaction interfaces in the display area of the electronic device:

switching a currently displayed interaction interface based on a switching operation.

17. The electronic device according to claim 13, wherein when at least two electronic devices are connected to the VR/AR device, the displaying the at least one interaction interface of the at least two interaction interfaces in the display area of the electronic device comprises:

after the detecting that the VR/AR device connected to the electronic device enters the predetermined operating mode, displaying in the display area of the electronic device, the at least one interaction interface different from another interaction interface of another electronic device, wherein the at least two electronic devices connected to the VR/AR device include the electronic device and the another electronic device.

18. The electronic device according to claim 13, the predetermined operating mode including a virtual personal computer (PC) mode.

19. The electronic device according to claim 13, the interaction operation achieves at least one of positioning, dragging, zooming, drawing, or character entering.

20. The electronic device according to claim 13, a correspondence between the interaction operation and the corresponding action is preset based on an operation habit of the user.

21. The electronic device according to claim 13, the operations further comprising:

sending size information of the display area of the electronic device to the VR/AR device.

* * * * *